United States Patent
Koksal et al.

(10) Patent No.: US 10,623,111 B2
(45) Date of Patent: Apr. 14, 2020

(54) DATA DELIVERY USING ACOUSTIC TRANSMISSIONS

(71) Applicant: Ohio State Innovation Foundation, Columbus, OH (US)

(72) Inventors: Can Emre Koksal, New Albany, OH (US); Harihara Varma Indukuri, Chicago, IL (US)

(73) Assignee: Ohio State Innovation Foundation, Columbus, OH (US)

( * ) Notice: Subject to any disclaimer, the term of this patent is extended or adjusted under 35 U.S.C. 154(b) by 123 days.

(21) Appl. No.: 15/912,979

(22) Filed: Mar. 6, 2018

(65) Prior Publication Data
US 2018/0262277 A1    Sep. 13, 2018

Related U.S. Application Data

(60) Provisional application No. 62/549,096, filed on Aug. 23, 2017, provisional application No. 62/468,066, filed on Mar. 7, 2017.

(51) Int. Cl.
*H04B 11/00* (2006.01)
*H04L 27/26* (2006.01)
(Continued)

(52) U.S. Cl.
CPC ............ *H04B 11/00* (2013.01); *H04L 5/0048* (2013.01); *H04L 27/2613* (2013.01); *H04L 27/2675* (2013.01); *H04R 1/22* (2013.01)

(58) Field of Classification Search
CPC ............ H04W 12/0808; H04W 52/325; H04B 1/207; H04B 1/0017; H04B 1/0042;
(Continued)

(56) References Cited

U.S. PATENT DOCUMENTS 6,631,196 B1   10/2003  Taenzer et al.
7,995,722 B2    8/2011  Vayssiere
(Continued)

FOREIGN PATENT DOCUMENTS

WO    2016113345 A1    7/2016

OTHER PUBLICATIONS

Timothy M. Schmidl and Donald C. Cox, Robust Frequency and Timing Synchronization for OFDM, IEEE Transactions on Communications, vol. 45, No. 12, Dec. 1997, pp. 1613-1621.
(Continued)

*Primary Examiner* — Ashley Shivers
(74) *Attorney, Agent, or Firm* — Wood Herron & Evans LLP

(57) ABSTRACT

Systems, methods, and computer program products for delivering information to an individual, group, or device. The information is carried by audio signals beyond the audible frequency range of human hearing, but within the frequency range of an audio system. The information is modulated onto an ultrasonic frequency and embedded into an audio signal transmitted by the audio system. Each individual, group member, or device may have or be coupled to a receiver configured to receive an acoustic signal transmitted by the audio system that includes the modulated ultrasonic frequency. The receiver extracts the information from the modulated ultrasonic frequency and provides the information to the individual, group member, or device.

21 Claims, 13 Drawing Sheets

(51) Int. Cl.
*H04L 5/00* (2006.01)
*H04R 1/22* (2006.01)

(58) Field of Classification Search
CPC .... H04B 1/0057; H04B 1/0078; H04B 11/00; H04L 5/0048; H04L 5/005; H04L 5/0051
See application file for complete search history.

(56) References Cited

U.S. PATENT DOCUMENTS

| | | | |
|---|---|---|---|
| 9,755,785 B2 | 9/2017 | Walton et al. | |
| 2003/0212549 A1 | 11/2003 | Steentra et al. | |
| 2004/0141570 A1* | 7/2004 | Yamazaki | H04L 25/0204 375/340 |
| 2013/0336497 A1 | 12/2013 | Duplan et al. | |
| 2014/0010532 A1* | 1/2014 | Zhang | H04B 10/0779 398/25 |
| 2014/0050321 A1 | 2/2014 | Albert et al. | |
| 2014/0156641 A1* | 6/2014 | Tripoli | G06F 17/30864 707/722 |
| 2014/0279101 A1 | 9/2014 | Duplan et al. | |
| 2015/0036847 A1* | 2/2015 | Donaldson | H04S 7/303 381/303 |
| 2015/0163336 A1 | 6/2015 | Ramos et al. | |
| 2016/0269128 A1* | 9/2016 | Gautama | H04B 11/00 |
| 2018/0105040 A1* | 4/2018 | Ryu | B60W 50/14 |

OTHER PUBLICATIONS

International Searching Authority, Search Report and Written Opinion issued in International Application No. PCT/US20185/021072 dated Jun. 15, 2018 (14 pages).

Jiang, Wentao, et.al., "Ultrasonic Wireless Communication in Air using OFDM-OOK Modulation," 2014 IEEE International Ultrasonics Symposium, Sep. 3, 2014, pp. 1025-1028 (4 pages).

Jiang, Wentao, et. al., "Indoor Wireless Communication Using Airborne Ultrasound and OFDM Methods," 2016 IEEE International Ultrasonics Symposium, Sep. 19, 2016, pp. 1-4 (4 pages).

* cited by examiner

DATA DELIVERY USING ACOUSTIC TRANSMISSIONS

This application claims the benefit of U.S. Application No. 62/468,066 filed on Mar. 7, 2017, and entitled "Intra-Vehicular Data Broadcasting Via the Audio Infrastructure", and U.S. Application No. 62/549,096 filed on Aug. 23, 2017, and entitled "Location Selective Data Delivery Via Low-Power Acoustic Transmissions", the disclosures of which are incorporated by reference herein in their entireties.

BACKGROUND

Modern communication systems typically use electromagnetic signals to carry information. These electromagnetic signals may be in the form of voltages and currents carried by wires or cables, or in the form of electromagnetic fields such as radio waves, microwaves, infrared signals, light, etc. transmitted through space, transmission lines, or waveguides. While electromagnetic signals provide a good physical layer for carrying information in many cases, they are not without shortcomings.

When devices that need to communicate are in fixed positions relative to one another, conductors are often used to convey information between the devices. For example, in a vehicle, numerous sensors and various system modules, such as the Engine Control Unit (ECU), may be connected through a wiring harness comprising a plurality of wires and/or cables. Cables may have certain advantages such as consistency of the connection, but they can also have certain drawbacks. For example, vehicular cables are bulky and heavy, and add significantly to the total weight of a modern automobile. Cables are also prone to external attacks such as tapping, which compromises the security of not only the data carried by the cables, but also the vehicle and its occupants since the information carried by the cables can be critical to operation of the vehicle. Cables can also degrade over time by flexing and/or exposure to the elements.

One way to reduce the use of cables is by transmitting data wirelessly using radio waves. Moving at least some of the wired communication to a wireless system that communicates using radio waves has the potential to reduce the number and weight of vehicular cables. Radio waves commonly refer to electromagnetic signals having frequencies that lie in a range of frequencies extending from around 3 kHz to 300 GHz. To transmit data using radio waves, a communication protocol must be used to encode the data so that it can be carried by the radio waves. The transmitted data is then recovered by decoding the data at the receiving end.

Two commonly used wireless communication protocols that use radio waves to transport information include Bluetooth®, which is a communications protocol maintained by the Bluetooth Special Interest Group (SIG) of Kirkland, Washingtion, and ZigBee®, which is an IEEE 802.15.4-based communication protocol maintained by the ZigBee Alliance of Davis, Calif. Both these protocols are standards for exchanging data over short distances using Ultra High Frequency (UHF) radio waves in the Industrial, Scientific and Medical (ISM) 2.4 GHz radio frequency band. Though both Bluetooth and Zigbee are capable of providing reliable high-speed communication, they also have shortcomings.

For example, devices communicating over Bluetooth must be "paired", or synchronized each time they are powered up, which takes a considerable amount of time. Zigbee uses the same frequency band as Wi-Fi®, which is communications protocol based on the IEEE 802.11 standards that is maintained by the Wi-Fi Alliance of Austin, Tex. When both Zigbee and Wi-Fi signals use the channel at the same time, it can create interference that causes a loss of data. Moreover, available radio spectrum is already congested, so using radio waves to replace cables in vehicles only adds to this congestion. The problems of radio spectrum congestion thus reduces the viability of radio waves as a replacement for cables in vehicles. In addition, wireless communication protocols transmitted using radio waves often have significant security issues, and may be vulnerable to jamming attacks.

Jamming attacks are denial-of-service attacks in which the attacker corrupts the content of a transmitted message by transmitting malicious radio frequency signals that corrupt or block the message. An attacker may jam a Bluetooth or Zigbee signal from outside a vehicle or building by transmitting interfering signals at the same frequency. Thus, even if the other problems associated with synchronization and congestion could be overcome, radio frequency-based communications protocols would still have significant security issues, and thus may be unsuitable replacements for cables.

Another environment that often uses wireless communication protocols are public areas such as airports, supermarkets, hospitals, sports venues, etc. Typically, these areas include one or more public and or private communication networks, such as Wi-Fi, cellular, cordless phones, two-way radios, etc. These communication networks are often provided or enhanced using access points and/or repeater systems that operate in the same frequency bands. When coupled with the high concentrations of devices often found in these crowded areas, interference and congestion can result.

Thus, there is a need for improved systems, methods, and computer program products which enable the transmission of data between devices and secure transmission of information to selected devices, individuals, or groups in public areas.

SUMMARY

Embodiments of invention are directed to acoustic communications systems, methods, and software products that transmit and receive information using acoustic signals. The acoustic communication systems may be configured to provide localized communications that enable private and contextual transmission of data in various environments, and may use frequencies outside the range of normal human hearing but that can be handled by conventional audio systems.

In an embodiment of the invention, an apparatus is provided. The apparatus includes a transmitter configured to receive a first signal to be transmitted to a device within an area covered by an audio system configured to emit acoustic signals into the area, generate a second signal in an ultrasound band that carries the first signal, and transmit the second signal to the audio system.

In another embodiment of the invention, a method is provided. The method includes receiving the first signal to be transmitted to the device within the area covered by the audio system configured to emit acoustic signals into the area, generating the second signal in the ultrasound band that carries the first signal, and transmitting the second signal to the audio system.

In another embodiment of the invention, a computer program product is provided. The computer program product includes a non-transitory computer-readable storage medium, and program code stored on the non-transitory computer-readable storage medium. The program code is configured so that, when executed by one or more processors, the program code causes the one or more processors to receive the first signal to be transmitted to the device within the area covered by the audio system configured to emit acoustic signals into the area, generate the second signal in the ultrasound band that carries the first signal, and transmit the second signal to the audio system.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
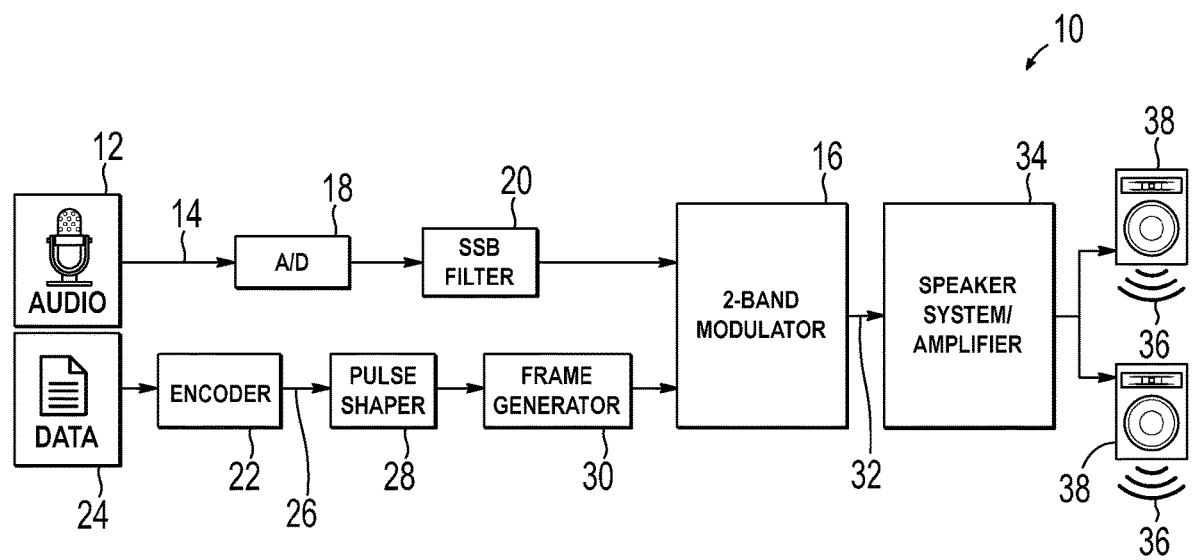
FIG. 1 is a diagrammatic view of a transmitter in accordance with an embodiment of the invention.

Embodiments of the invention may be used with audio systems to transmit multi-kbps data signals over a controlled range of distances, typically on the order of about 100 feet, using an acoustic communication signal. Exemplary audio systems that may be used to transmit the acoustic communication signal may include vehicle audio systems, public address systems, or any other audio system capable of carrying the acoustic communication signal. Transmitting the acoustic communication signal over an audio system configured to provide audible sound to persons in a specified area may enable embodiments of the invention to provide intra-vehicular communication between multiple devices as well as deliver multiuser location-selective data in larger spaces.

Acoustic communication signals may be generated using software or hardware components. For example, a microphone or other audio input of an audio system, such as a public-address system or audio system of a vehicle, may be coupled to a source of the communication signal so that the acoustic communication signal is broadcast over the area covered by the audio system. A targeted group comprising one or more members may receive analog audio and/or digital data embedded in the acoustic communication signal using a mobile application that extracts the analog audio and/or digital data from the acoustic communication signal received by a microphone of the mobile device.

Acoustic communication systems may enable targeted delivery of information to appropriate individuals, groups, and/or devices. At the physical layer, acoustic communication signals may comprise audio signals that can be transmitted using existing audio systems, thereby avoiding the need for separate wireless communication equipment. The acoustic communication signals may use parts of the audio spectrum within the frequency range of standard audio systems, but beyond the frequency range normally audible to a human, e.g., between 15 and 22 kHz. In addition to eliminating the requirement for additional wireless equipment by utilizing existing audio systems, embodiments of the invention may reduce the need for electromagnetic signals to carry the targeted information, thereby reducing wireless interference on existing unlicensed spectrum devices such as Wi-Fi access points and receivers, and amount of electromagnetic energy present in the environment. Unlike conventional radio-frequency based communication technologies, acoustic communications systems in accordance with embodiments of the invention may also be able to begin communications without the need to first set up a connection between the transmitter and the receiver.

Acoustic communication systems may be configured to receive data from various information sources (e.g., vehicle sensors), packetize the data, perform channel coding on the packets, modulate an ultrasonic carrier using coded symbols, and broadcast the resulting communication signal over the audio system. A microphone may receive the acoustic communication signal and provide it to a processor coupled to the microphone, e.g., through an Analog-to-Digital (A/D) converter. A receiver application or module executed by the processor may receive the digitized communication signal as input and recover the analog signals or digital data embedded therein. The data recovery process may use digital signal processing to demodulate the communication signal, apply matched filtering, frame-synchronize the output of the filter, correct any frequency and phase mismatches in the filtered signal, and decode the symbols to recover the data. After decoding the data, the data may be provided to another application for post-processing and/or display on a user interface of the device that received the acoustic communication signal.

Potential users of embodiments of the invention may include local, national, and international supermarket chains, hospitals, airlines, and users and manufacturers of vehicles, to name but a few. Indeed, any commercial or non-commercial entities that value eliminating wireless interference and/or reducing environmental electromagnetic energy levels may also benefit from embodiments of the invention. Advantageously, embodiments of the invention may operate without any interruption to the existing audible audio (e.g., music or public announcements) being broadcast over the audio system. Embodiments of the invention used in vehicles may also be naturally secure against jamming attacks due to a low-pressure field that typically forms around moving vehicles and impedes the transmission of sound waves into or out of the vehicle.

FIG. 1 depicts a cognitive audio 2-band transmitter 10 for transmitting combined audio and data in accordance with an embodiment of the invention. The transmitter 10 may include a transducer 12 (e.g., a microphone) that receives an audio signal (e.g., the voice of an announcer) to be broadcast to a targeted group, and/or a member of the targeted group or other individual using an acoustic communication signal embedded in the normal transmissions of an audio system. An analog signal 14 (e.g., a voice announcement) output by the transducer 12 may be coupled to a 2-band modulator 16 by an analog-to-digital (A/D) converter 18 and a Single Side-Band (SSB) filter 20. By way of example only, the A/D converter 18 may be a low-rate A/D converter having a sampling rate of 44.1 kHz and a resolution of 8-bits.

The transmitter 10 may further include an encoder 22 configured to receive and encode a digital signal 24 (e.g., a data stream) to be broadcast to the targeted group using the embedded acoustic communication signal. Encoded data 26 output by the encoder 22 may be coupled to the 2-band modulator 16 by a pulse shaper 28 and frame generator 30. The frame generator 30 may encode the data into packets that are provided to the 2-band modulator 16. The 2-band modulator 16 may map each packet to a symbol and generate a communication signal 32 by modulating a carrier signal having an ultrasonic frequency with one or more of the signals received from the SSB filter 20 and/or frame generator 30. Each symbol may be a complex value that defines a point in a signal constellation of the modulation scheme being used to modulate the carrier signal, e.g., Binary Phase-Shift Keying (BPSK), Quadrature Phase-Shift Keying (QPSK), etc. The communication signal 32 may be provided to an audio system 34 (e.g., a public-address system) and broadcast as an acoustic signal 36 by one or more speakers 38. The acoustic signal 36 may include a combination of audio intended for the general public (e.g., music or announcements in the audible frequency band) and information carried by the ultrasonic communication signal 32.

Figure 2:
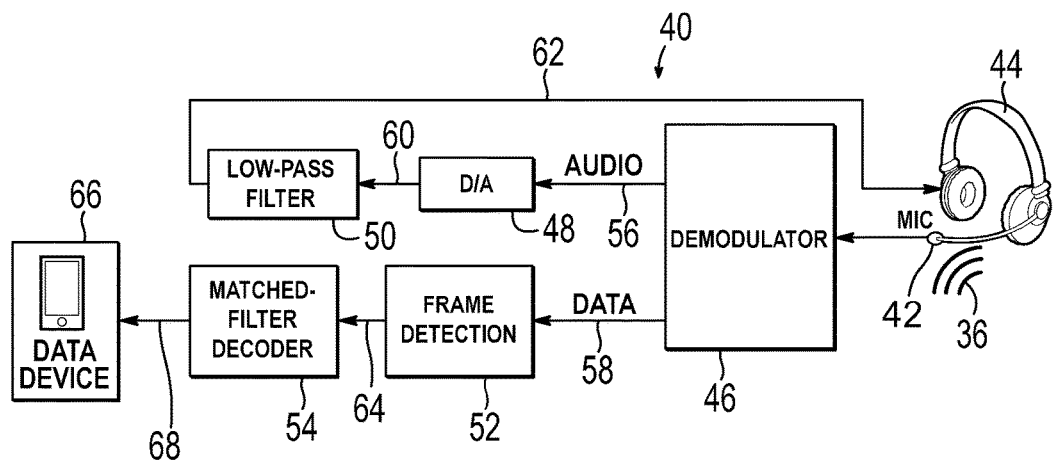
FIG. 2 is a diagrammatic view of a receiver for receiving a signal transmitted by the transmitter of FIG. 1.

FIG. 2 depicts a receiver 40 that may be used for receiving the acoustic signal 36 emitted by the speakers 38. The receiver 40 may include one or more transducers, e.g., a microphone 42 and an earphone 44, a demodulator 46, a digital-to-analog (D/A) converter 48, a filter 50 (e.g., a low-pass filter), a frame detector 52, and a decoder 54 (e.g., a matched-filter decoder). The microphone 42 may be configured to receive the acoustic signal 36 and provide it in an electrical form to the demodulator 46. The demodulator 46 may be configured to extract the communication signal 32 from the acoustic signal 36, and demodulate the communication signal 32 into one or more of a recovered digital audio signal 56 and/or data signal 58.

The D/A converter 48 may convert the digital audio signal 56 into an unfiltered analog audio signal 60. The unfiltered analog audio signal 60 may be provided to the filter 50, which may be configured to remove any image frequencies above the Nyquist limit of the digital audio signal 56. The resulting filtered analog audio signal 62 may be provided to the earphone 44 so that an employee or another authorized person in the targeted group can hear a broadcast message.

The frame detector 52 may detect the beginning and end of each frame (e.g., by detecting start of frame and end of frame headers or pilot sequences), and provide a signal 64 corresponding to each frame to the decoder 54. The decoder 54 may compare the signal 64 received from the frame detector 52 to one or more expected signals. Based on this comparison, the decoder 54 may determine that the data carried by the frame is the data associated with the expected signal which most closely matches the signal 64 received from the frame detector 52. The decoder 54 may provide this data to a computing device, e.g., a smart phone 66, in the form of a digital signal 68.

The transmitter 10 may thereby combine two signals and broadcast analog audio and/or digital data over unused and inaudible audio bands. The receiver 40 may in turn separate the two signals and pass them onto the appropriate device, e.g., the earphone 44 and/or smart phone 66. In an alternative embodiment of the invention in which the speakers 38 are analog speakers (i.e., the speakers 38 do not include a D/A converter at their input), the transmitter 10 may include a D/A converter (not shown) that converts the communication signal 32 into an analog signal that is compatible with analog audio systems.

Although the exemplary transmitter 10 and receiver 40 depicted by FIGS. 1 and 2 are illustrated as processing one analog signal 14 and one data signal 24, embodiments of the invention are not so limited. For example, alternative embodiments of the transmitter 10 and receiver 40 may support a plurality of signals including any combination of one or more analog signals 14 and/or data signals 24 each modulated onto one of a plurality of carrier frequencies. Each of the data/audio signals may be processed at baseband and modulated up to a transmission band (e.g., using two carrier frequencies of around 19.0 and 21.5 kHz, respectively) that can be broadcast via existing audio systems. The receiver 40 may receive these signals from the microphone 42, and de-modulate and decode the combined signals (e.g., analog audio and digital data) for the end user. The receiver 40 may process the analog and/or digital signals separately and send them to the appropriate devices.

Figure 3:
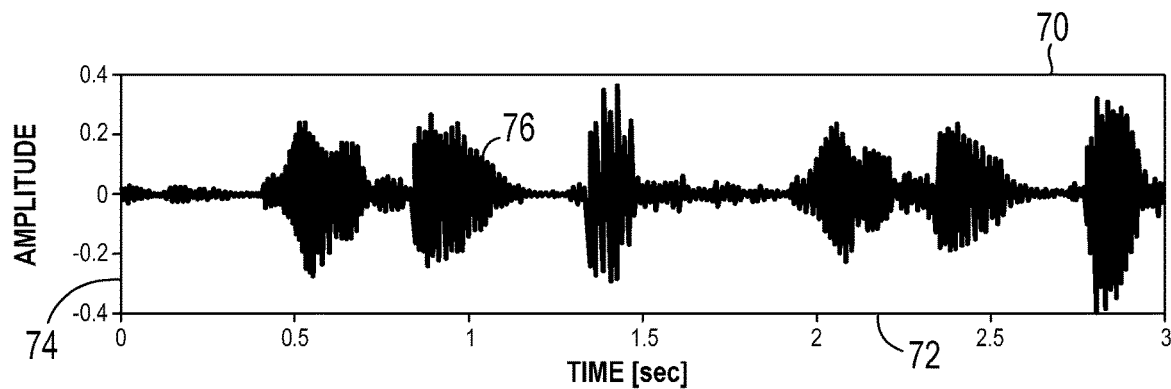
FIG. 3 is a graphical view illustrating an exemplary audio sample in the time domain that may be provided to the transmitter of FIG. 1.
Figure 4:
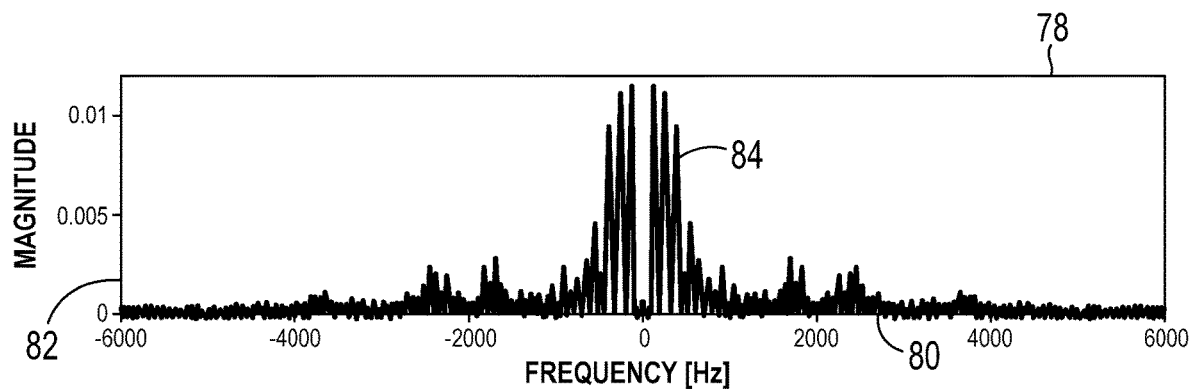
FIG. 4 is a graphical view illustrating the exemplary audio sample of FIG. 3 in the frequency domain.

FIG. 3 depicts an exemplary graph 70 including a horizontal axis 72 corresponding to time and a vertical axis 74 corresponding to an amplitude of an audio signal, and a time domain plot 76 of the audio signal having a finite duration, e.g., of about 3 seconds. FIG. 4 depicts an exemplary graph 78 including a horizontal axis 80 corresponding to frequency, a vertical axis 82 corresponding to the amplitude of signal, and a frequency domain plot 84 of the audio signal represented by plot 76 of FIG. 3.

The audio signal may be filtered to remove one of the side-bands as well as frequencies above a cutoff frequency. The filter may be implemented, for example, using a finite impulse-response (FIR) single-sideband (SSB) filter that filters the signal in the digital domain. SSB filtering may enable an audio signal having a frequency bandwidth of 0-3 kHz to be transmitted within a 3 kHz band.

Figure 5:
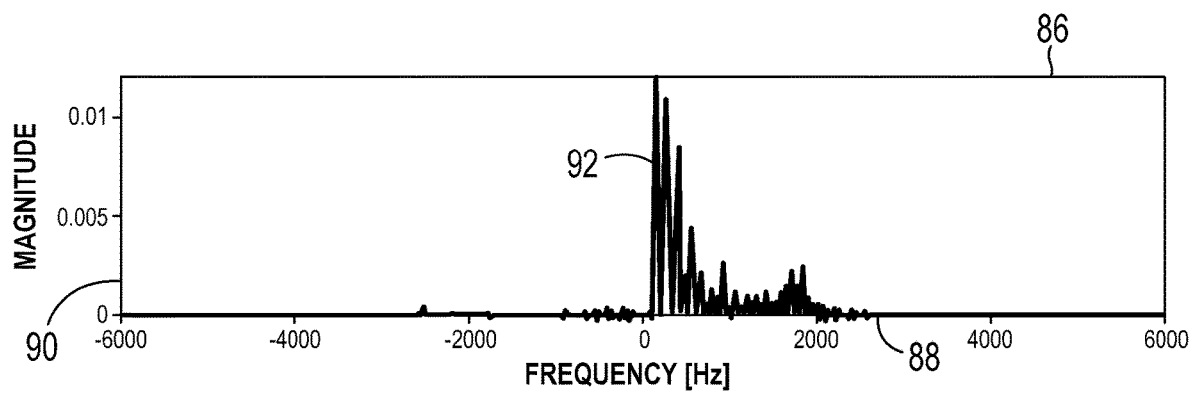
FIG. 5 is a graphical view of the exemplary audio sample of FIG. 4 after filtering with a single side-band filter.

FIG. 5 depicts an exemplary graph 86 including a horizontal axis 88 corresponding to frequency, a vertical axis 90 corresponding to the amplitude of a signal, and a frequency domain plot 92 illustrating the resulting spectrum of the audio signal of FIG. 4 after SSB filtering. The spectrum of the depicted exemplary filtered audio signal may be the complex output of an SSB filter comprising an FIR filter having an impulse response of length of 250, and a cutoff band having a starting frequency of 2.00 kHz and an ending frequency of 2.05 kHz. The filtered signal may be up-converted into a high frequency acoustic or ultrasound band (e.g., 17.5-20.5 kHz) and broadcast by the speakers 38 as an acoustic signal comprising sound waves. Due to vagaries of the audio channel and the relatively narrow bandwidth of the available transmission band, data transmissions may be used primarily for low-bandwidth applications such as text communication or control signaling, for example. If higher data transmission rates are desired, the entire transmission band may be used for transmitting data. In this case, a portion of the acoustic communication signal may become audible. However, the content of the signal would likely be unintelligible depending on the type modulation used, and might go unnoticed depending on the amplitude, ambient noise levels, and spectral characteristics of the signal.

At the transmitter 10, digital information represented as bits may be mapped into a set of symbols by a digital modulator, with each symbol in the set representing a unique sequence of one or more bits. This mapping may include, for example, BPSK, QPSK, or any other suitable modulation scheme. A training or pilot sequence known in advance to the transmitter 10 and receiver 40 may be inserted as a header into each frame to form a data packet that is transmitted using one or more symbols. The pilot sequence may be used by the receiver 40 for synchronization, to determine a frequency mismatch and/or a phase mismatch between the transmitter 10 and receiver 40, and to characterize the channel through which the transmitter 10 and receiver 40 are communicating. The communication signal 32 may thereby be encoded into a sequence of symbols corresponding to the signal being transmitted to the targeted group.

The transmitter 10 and receiver 40 may also use channel coding to provide forward error correction. After channel coding, the data packets may be modified so that they can be transmitted effectively through a relatively narrow band analog communication channel, e.g., using pulse shaping. By way of example, the data packets may be modified using a filter that satisfies the Nyquist inter-symbol interference criterion, and/or using a Square-Root Raised Cosine (SRRC) pulse with a band-width extension factor of between 0.4-0.6. The modified signal may be modulated and/or up sampled using a suitable modulation scheme, such as Quadrature Amplitude Modulation (QAM), to the desired carrier frequency, which as described above, may be an inaudible frequency range. The resulting communication signal may then be broadcast through the audio system 34.

Although the transmitter 10 and receiver 40 are described above using certain exemplary modulation schemes, embodiments of the invention are not limited to any particular modulation scheme, and may use any suitable type of modulation. As one example, Orthogonal Frequency Division Multiplexing (OFDM) may be used to allow for wideband systems having higher data rates than those provided by other modulation schemes.

Controller Application

Figure 6:
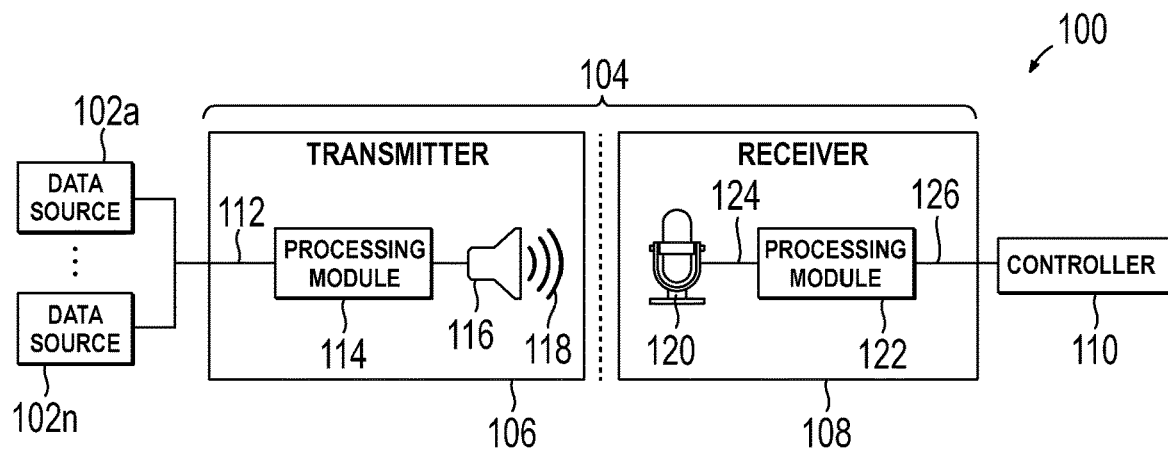
FIG. 6 is a diagrammatic view of an operating environment that includes data sources, a transmitter, a receiver, and a controller in accordance with an embodiment of the invention.

FIG. 6 depicts an operating environment 100 that includes one or more data sources 102a-102n, an acoustic communication system 104 including a transmitter 106 and a receiver 108, and a controller 110. In an embodiment of the invention, the data sources 102a-102n may include sensors located in or around a vehicle or its components, such as a pressure sensor, oxygen sensor, temperature sensor, or any other source of data or signals that might be found in a vehicle, and the controller 110 may be an Engine Control Unit (ECU). Each of the data sources 102a-102n may measure a parameter (e.g., air pressure, oxygen level, temperature, etc.) and transmit a digital or analog signal 112 representative of the value of that parameter to the transmitter 106. The transmitter 106 may include a processing module 114 and a transducer 116. The processing module 114 may be coupled to, and receives the signals 112 from, the data sources 102a-102n. The transducer 116 may comprise an amplifier and/or speaker of a vehicular audio system that is coupled to the processing module 114, and may convert the communication signal 112 generated by the processing module 114 into an acoustic communication signal 118. The processing module 114 of transmitter 106 may be configured to process each signal 112 received from the data sources 102a-102n. This processing may include encoding the signals 112 into data packets, and modulating an ultrasonic carrier based on the contents of the data packets to generate the acoustic communication signal 118.

The receiver 108 may include a transducer 120 (e.g., a microphone) that is coupled to a processing module 122. The transducer 120 may receive the acoustic communication signal 118 and convert it into a received communication signal 124 suitable for processing by the processing module 122, e.g., a time varying voltage. The processing module 122 of receiver 108 may be configured to recover the data packets transmitted by the transmitter 106 from the communication signal 124, and output the recovered signals 126. To this end, the processing module 122 may use digital signal processing to demodulate the communication signal 124 and extract the encoded data packets. The recovered data packets may be transmitted to the controller 110, which may then adjust one or more parameters (e.g., the air-fuel ratio, idle speed, valve timing, etc.) based on the recovered data and/or signals 126. For the case of the controller 110 comprising an ECU, the controller 110 may use the data generated by the data sources 102a-102n to control certain aspects of the vehicle.

Figure 7:
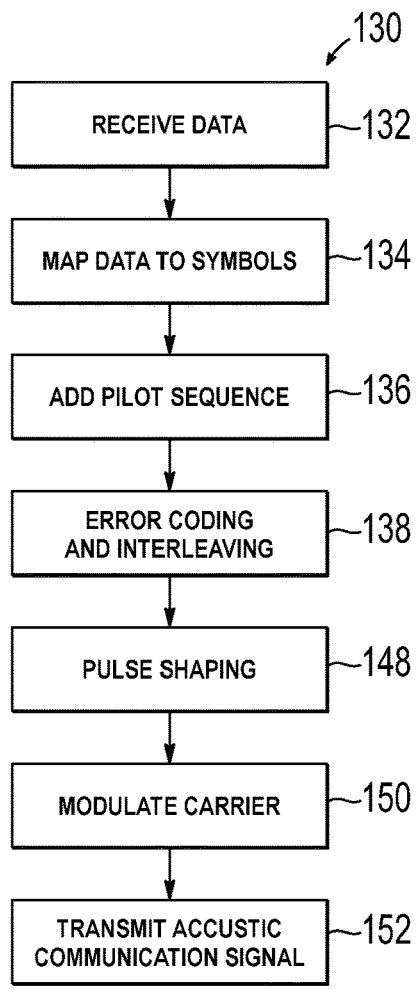
FIG. 7 is a flow chart of a process for transmitting data that may be implemented by the receiver of FIG. 6.

FIG. 7 depicts a flow chart illustrating of an exemplary process 130 that may be implemented by the processing module 114 of transmitter 106. In block 132, the process 130 may receive data from one of the data sources 102a-102n. The data may be, for example, a stream of data received over a serial or parallel data bus, and may be stored in a buffer until there are enough bits for coding, to fill a frame, and/or for symbol mapping.

In block 134, the process 130 may map the received data to one or more information symbols. Each information symbol may encode one or more binary digits or "bits" into a modulation state or waveform, e.g., a phase, amplitude, or frequency, or a change thereof, that corresponds to a point in a signal constellation of the modulation scheme. For example, a sequence of three bits may be mapped to one of eight complex numbers each defining a unique phase, amplitude, frequency, or change in phase, amplitude, or frequency, or any combination thereof. In an embodiment of the invention, the received data may be mapped to information symbols in accordance with a BPSK or QPSK modulation scheme.

To facilitate data synchronization at the receiver, in block 136, the process 130 may add one or more pilot symbols to the information symbols. The pilot symbols may correspond to a known predetermined sequence of one or more bits. Pilot symbols may be added periodically to the information symbols received from the data mapper to define the beginning and/or end of a transmit frame comprising a number of information symbols. By looking for this known sequence, the receiver can determine where a transmit frame starts and ends based on the location of the pilot symbols. The pilot symbols may be added at the beginning of each transmission frame at the transmitter for frame synchronization as well as frequency, phase, and/or channel estimation at the receiver. In an embodiment of the invention, pilot symbols may be mapped from among a set of randomly generated pilot sequences. The pilot sequences may also be selected from a set of Barker sequences. Barker sequences may be used because they typically provide a good cross correlation at the receiver end when performing frame synchronization.

Once the pilot symbols have been added, the process 130 may proceed to block 138 and add error coding and interleaving. Error coding, or forward error correction, is a technique used in digital communication to control errors in data transmission over unreliable or noisy channels. In an embodiment of the invention, the channel coding may be based on a concatenated structure. An inner code may be a linear block code and an outer code may be chosen from a set of turbo codes having rates that are adaptively varied by selecting rates from a set of rates that cover a range of rates, e.g., between $1/7$ and $1/3$. The turbo coding may be performed by a turbo encoder in the processing module 114 of transmitter 106, and decoding by a corresponding turbo decoder in the processing module 122 of receiver 108.

Figure 8:
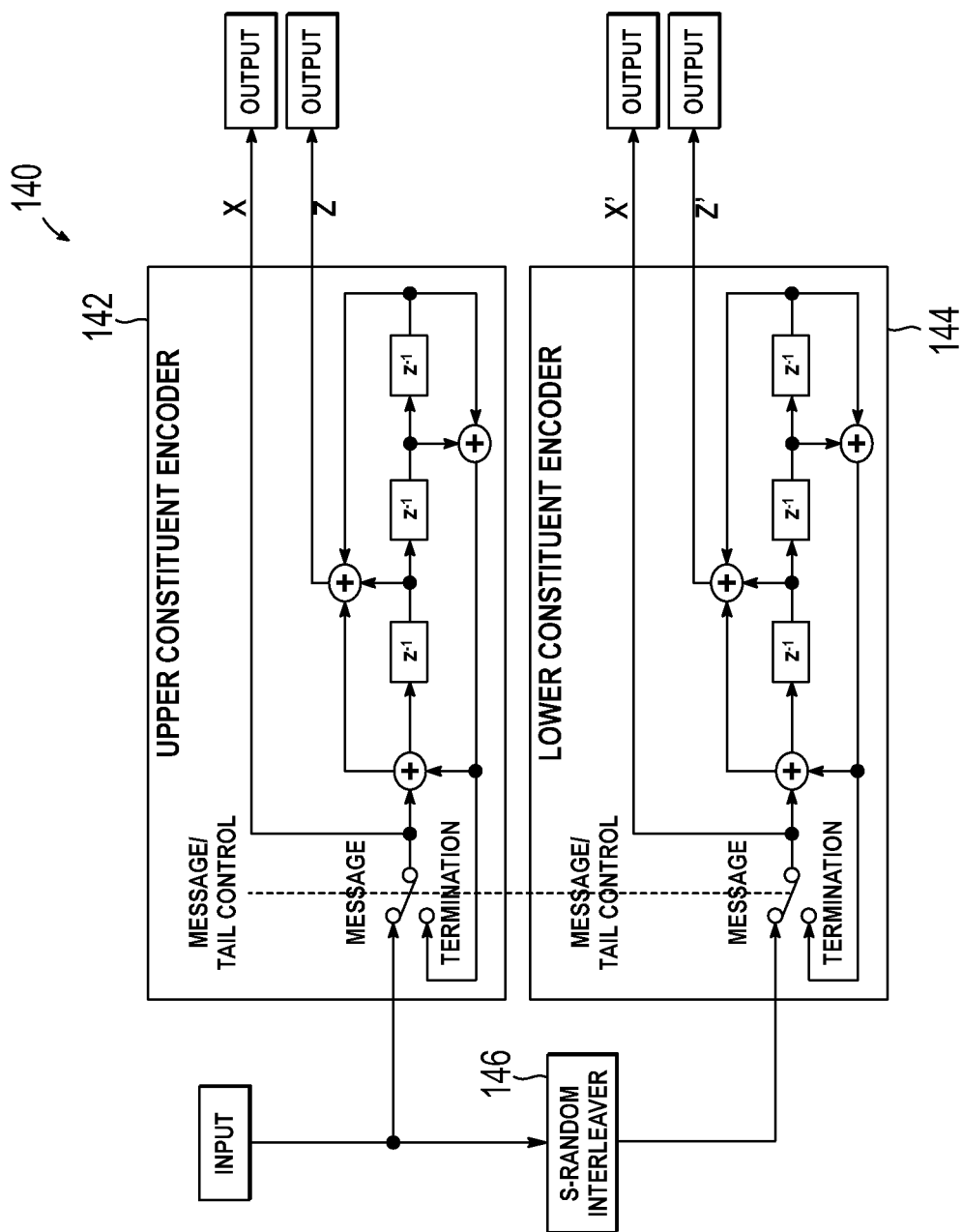
FIG. 8 is a diagrammatic view of an encoder that may be used by the receiver of FIG. 6 to provide forward error correction.

FIG. 8 depicts an exemplary turbo coder/interleaver 140 that uses Parallel Concatenated Convolution Codes (PCCC) including an upper constituent encoder 142, a lower constituent encoder 144, and an interleaver 146. The upper and lower constituent encoders 142, 144 may be identical simple constituent encoders. Each encoder 142, 144 may include four main characteristics that affect the performance of the turbo code. These characteristics are the polynomials used to generate parity bits, the number of delay elements, or "constraint length" (three in the depicted embodiment), the interleaver 146, and the puncturing patterns/code rate.

The exemplary generator polynomials used to generate parity bits in the depicted embodiment include a feedforward generator polynomial and a feedback generator polynomial. The feedforward generator polynomial may be provided by:

$$1+z^{-1}+z^{-3} \qquad \text{(Eqn. 1)}$$

The feedforward generator polynomial may generate coder outputs Z and Z', and may be produced by the depicted three-element delay line and generator polynomial coefficients of [1, 1, 0, 1]. The feedback generator polynomial, which generates outputs X and X', may be provided by:

$$1+z^{-2}+z^{-3} \qquad \text{(Eqn. 2)}$$

and may be produced by the three-delay element delay line and generator polynomial coefficients of [1, 0, 1, 1]. The upper and lower constituent encoders 142, 144 may comprise, for example, tapped shift registers the outputs of which are summed to generate parity bits. In an embodiment of the invention, the turbo coder 140 may include a puncturing pattern that deletes some bits in the coded bit sequence by following a fixed pattern. One such puncturing pattern may be represented as "3FFFFFFF" in hexadecimal format.

The interleaver 146 may be an S-random interleaver that interleaves message bits passed to the lower constituent encoder 144 of turbo coder 140. The interleaver 146 may pass a random permutation of message bits to the lower constituent encoder 144. Interleaving may be performed along with channel coding to reduce the effects of burst errors on the transmitted data. The interleaver 146 may accomplish this by spreading each symbol across several code words, thereby creating a more uniform distribution of errors when the acoustic communication signal is transmitted through a noisy channel.

Returning to FIG. 7, in block 148, the process 130 may pass the output of the error coding/interleaving module through a pulse shaping filter to prepare the symbols for transmission. Pulse shaping may alter the waveform of the transmitted pulses used to transmit each symbol so that the modulated signal is better suited for the communication channel. Typically, pulse shaping is accomplished using filters that limit the effective bandwidth of the modulated signal. In an embodiment of the invention, the pulse shaping may be performed using a square-root-raised cosine filter having a bandwidth expansion factor of between 40% and 60% (e.g., 50%). Filtering the symbols prior to modulation may reduce Inter-Symbol Interference (ISI) by altering the abruptness with which the modulated carrier signal moves from one point in the signal constellation to the next.

In block 150, the process 130 may modulate a carrier frequency with the filtered symbols. The carrier frequency may be, for example, a complex carrier in a frequency range of 15-22 kHz that is utilized to produce the communication signal. In block 152, the process 130 may transmit the communication signal by providing it to an audio system so that the acoustic communication signal is broadcast into the desired area.

Figure 9:
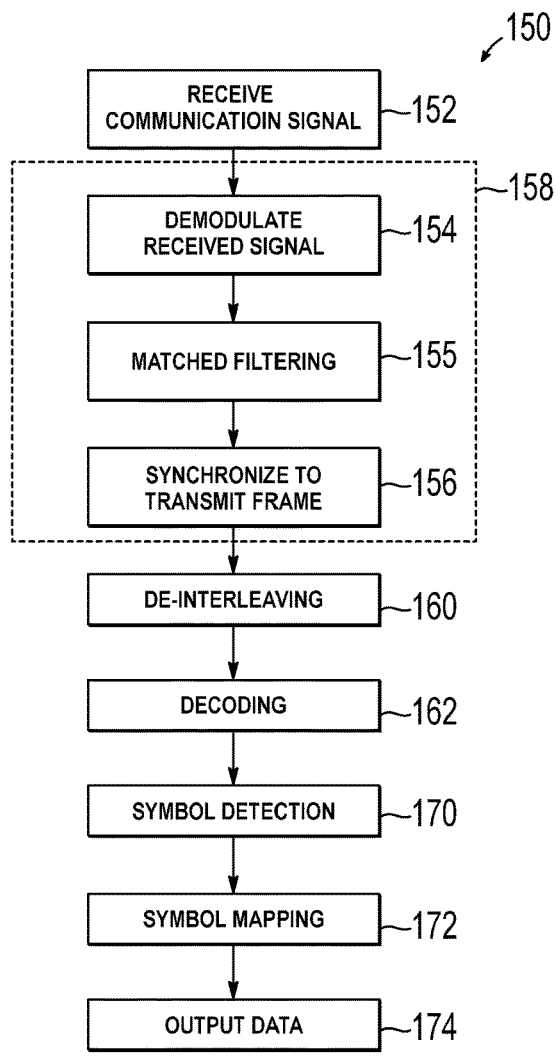
FIG. 9 is a flow chart of a process for receiving data that may be implemented by the receiver of FIG. 6.

FIG. 9 depicts a flow chart illustrating an exemplary process 150 that may be implemented by the processing module 122 of receiver 108. In block 152, the process 150 may receive the communication signal. The communication signal may be received, for example, from an acoustic transducer (e.g., a microphone) located in an area covered by the acoustic communication signal transmitted by process 130. The microphone may provide the communication signal to the processing module 122 of receiver 108, which may implement the receiver blocks.

In block 154, the process 150 may demodulate the communication signal. The communication signal may be received as a passband signal having an ultrasonic frequency, and may be down-converted to a baseband signal by a demodulator block. Demodulation may extract the baseband signal from the passband signal using the same carrier frequency as the modulator block in the processing module 114 of transmitter 106.

In block 155, the process 150 may process the demodulated signal through a matched filter. The matched filter may be a square-root-raised cosine filter similar to the one implemented by process 150. Collectively, the matched filters implemented by the transmitter 106 and the receiver 108 may provide a raised-cosine filter. A portion of the filtering may be provided by the square-root-raised cosine filter in the transmitter 106, and another portion of the filtering may be provided by the square-root-raised cosine filter in the receiver 108 so that the overall channel response is that of a raised-cosine filter. Using a matched filter to detect the transmitted symbols may increase the Signal-to-Noise Ratio (SNR) of noisy signals by allowing the receiver 108 to sample the signal at appropriate intervals and detect the transmitted symbols. The process 150 may implement this feature by performing a linear convolution between the symbols in the demodulated signal.

Once the demodulated signal has been filtered, the process 150 may proceed to block 156 and synchronize the received symbols. The channel through which the acoustic communication signal 118 passes on its way from the processor module 114 of transmitter 106 to the processing module 122 of receiver 108 may add a significant amount of distortion to the received communication signal 124. These distortions may include frequency offset, phase offset, timing offset, multi-path interference, noise, etc. To estimate and correct for these distortions, the process 150 must determine where the transmit frame starts and ends. The pilot sequence added to the transmit frame may aid the receiver 108 in this task. Since the pilot sequences are known to both the transmitter 106 and receiver 108, these sequences may be used for both frame synchronization and to estimate frequency, phase, and amplitude shifting of the received signal 124.

Frame synchronization may be accomplished by identifying pilot sequences in the received signal 124. To this end, the process 150 may perform a cross-correlation between the known pilot sequences and the received symbols. The output of the cross-correlator may peak whenever the pilot sequences correlate with the received symbols. This peak may indicate the position of the pilot sequences in the received communication signal 124. The frequency and phase offsets may then be estimated by comparing the phase and frequency of the received pilot sequences with the known phase and frequency of the corresponding transmitted pilot sequences. These estimated frequency and phase offsets may be used to correct for the offsets. Once the received sequence of symbols is synchronized, the signal may be ready to pass through the decoding process to extract the binary data stream.

In an alternative embodiment of the invention, the process 150 may perform demodulation, frequency mismatch correction, matched filtering, and synchronization of blocks 154-156 simultaneously in block 158. To this end, the processing module 122 of receiver 108 may include a receiver block that that implements these four sub-processes in a combined fashion using a recursive algorithm that estimates the remaining frequency mismatch in each step, adjusts the demodulator carrier frequency accordingly, match filters the demodulated signal, synchronizes the signal using the pilot symbols, and re-estimates the frequency mismatch.

In block 158, the process 150 may start with the modulation frequency set by the demodulator. The sampling rate at the output of the demodulator may be several times the symbol rate, e.g., between 70 and 180 times the symbol rate. The ratio of the sample rate to the symbol rate, or oversampling ratio, may determine the maximum achievable accuracy in symbol synchronization. Due to the low bandwidths involved in acoustic communication, the processing module 122 of receiver 108 may be able to handle a large oversampling ratio. These samples may be used for frame synchronization, for which the processing module 122 may calculate the cross correlation between the samples of the received communication signal 124 and the pilot sequences. Frame synchronization using high over-sampling rates may be more accurate than other methods since the resolution of the correlation peak is inversely proportional to the sampling rate. The high sampling rate may also provide symbol synchronization, thereby eliminating the need for a separate symbol synchronization process. In addition, the frequency mismatch may be estimated using a linear-least-squares estimate of the phase changes across samples. The above process may be repeated iteratively using the most-recent frequency mismatch estimate until the estimated pilot symbol location remains the same in two successive iterations. This iterative process may produce an extremely accurate frequency lock, e.g., having a frequency error $f_{error} < 10^{-3}$ Hz.

By way of example, and to explain operation of combined process of block 158, a received signal y(t) may be sampled at a rate $F_s$ (e.g., 44,100 samples/sec.) to generate a discrete received signal $y_s[n]$ suitable for processing by the processing module 122 of receiver 108. For a symbol rate of $r_s$ symbols/sec., the discrete received signal $y_s[n]$ should have $F_s/r_s$ samples per symbol. For a signal y(t) generated using a pilot sequence $x_p[k]$ having a length N, a discrete received pilot signal may be the up-sampled version of the pilot sequence $x_p[k]$ sampled at the same up-sampling rate of $F_s/r_s$ and convolved with a pulse p(t). The length N of the bit sequence may be the same as the length of the symbol sequence for BPSK modulation since there is a one-to-one correlation between bits and symbols for this type of modulation. The pilot sequence $x_p[k]$ may be, for example, a sequence having favorable cross-covariance properties that is selected from a large pool of randomly generated BPSK sequences.

The discrete signal $y_s[n]$ may be demodulated using a complex carrier at a center frequency of $f_{c,r}$ to produce a baseband demodulated signal $y_s^b[n]$. A frequency mismatch $\Delta f$ between the transmitter and the receiver may be present, e.g., due to differences in the clock frequencies of the transmitter 106 and the receiver 108, Doppler shift, etc.

The baseband demodulated signal $y_s^b[n]$ may be matched filtered, and synchronization obtained by finding the sequence of samples that locks onto the pilot sequence of the filtered signal. The appropriate samples associated with correlation peaks of the pilot symbols may be separated by $F_s/r_s$. To find the sequence that locks onto the pilot sequence, the signal accumulated at the output of the matched filter may be down-sampled by $F_s/r_s$ and projected onto the known pilot sequence $x_p[k]$. In response to a threshold level being crossed, the process 150 may determine that a packet is present. The process 150 may then search for a synchronization lock point within $NF_s/r_s$ samples of the point at which the threshold was crossed. The projections of the down-sampled matched filter output may be compared for each successive sample and the lock point defined as the sample at which the projection is maximized. The associated (complex) sequence of N samples may be denoted by $\hat{y}_p[k]$.

The process 150 may perform a frequency mismatch recovery by checking the angle of the following complex sequence:

$$\frac{\hat{y}_p}{x_p}[k] \quad \text{(Eqn. 3)}$$

To this end, a line ak+b that gives the least squares fit to the angled sequence of Eqn. 3 may be determined, and a and b used as estimates for the frequency and phase mismatch, respectively.

The above process from demodulation on may be repeated with a new center frequency, $f_{c,r}$−a. The new baseband signal may go through the same process iteratively until the start sample for the pilot sequence remains the same for two iterations in a row. It has been determined that with low mobility, these loops typically converge on an extremely accurate frequency lock with a frequency error of less than $10^{-3}$ Hz. With the lock having been obtained, the received (noisy) pilot sequence $\hat{y}_p[k]$ may be used to estimate the channel. In this exemplary embodiment, a maximum likelihood estimator that can be used to estimate the channel taps $h_l$ may be provided by:

$$\hat{h}_l = \frac{1}{Ne_p} \hat{y}_p[l] * x_p^*[N-l] \quad \text{(Eqn. 4)}$$

where $e_p$ is the energy of the pilot sequence, $x_p^*$ is the complex conjugate of the pilot sequence, $\hat{h}_0$ represents the output of the first tap, $h_1$ represents the output of the next tap, and so on.

Once the process 150 has demodulated, filtered, and synchronized the incoming signal, it may proceed to block 160 to de-interleave the signal and block 162 to decode the signal. The de-interleaving and decoding performed by the process 150 in blocks 160 and 162 may be essentially the reverse of the interleaving and channel coding described above with respect to process 130. De-interleaving may be used to eliminate redundant data added during interleaving and to check for burst errors in the signal. If turbo codes are used at the transmitter for channel decoding, then a Viterbi decoder may be used to perform the channel decoding. The decoder may automatically correct for errors in the data packet using a maximum likelihood algorithm. For the inner code, the process 150 may perform a systematic decoding operation, while for the outer code, the process 150 may use a turbo/Viterbi decoder.

Figure 10:
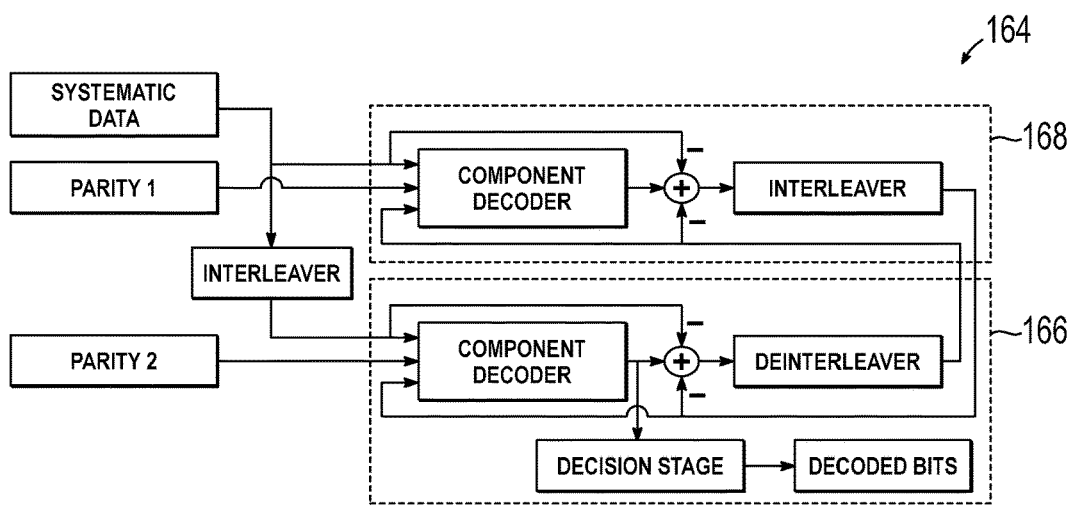
FIG. 10 is a diagrammatic view of a decoder that may be used by the transmitter of FIG. 6 to correct errors in the received data.

FIG. 10 depicts an exemplary turbo decoder 164 that decodes the input signal using a parallel concatenated decoding scheme which employs a true a-posteriori probability (true APP) decoder as the constituent decoder. The constituent decoder used in decoding may be same as the constituent encoder used in coding. The turbo decoder 164 may use an iterative decoding process in which output of a lower constituent decoder 166 is fed back to an upper constituent decoder 168. In iterative decoding, BER performance may be increased by increasing the number of decoding iterations. In an embodiment of invention, the process 150 may use seven decoding iterations.

Returning to FIG. 9, in block 170, the error-corrected signal output by the channel decoder block may be passed to a symbol detection block. In the symbol detection block, the process 150 may determine which information symbols have been received. The process 150 may then proceed to block 172 and map each information symbol back to data bits using the same algorithm used at the transmitter 106 for bit to symbol mapping, but in a reverse order. The symbol mapping block 172 may thereby convert the symbols to output data 174 that defines the sensor values. The output data 174 may be passed to the controller 110, which can adjust inputs to the controlled systems based on the value of the parameter being detected by the sensor. The processes 130, 150 described above may be carried out for each data packet transmitted and received by the acoustic communication system 104.

Data Monitoring Application

In an embodiment of the invention, a data monitoring application may be installed in a user device, such as a smart phone, that receives and interprets data transmitted between the transmitter 106 and the receiver 108 by eavesdropping on the acoustic communication signal 118. The data monitoring application may be configured to decode and process the data transmitted from the transmitter 106, and in the case of in-vehicle use, may provide automotive diagnostic functions. This embodiment of the data monitoring application may use the data from the data sources 102a-102n that is extracted from the communication signal 118 to monitor operation of the vehicle and diagnose problems. Advantageously, unlike conventional car diagnostic OEM-based applications that require installation of extra hardware in the vehicle and/or rely on radio frequency communications protocols such as Bluetooth that are prone to various attacks, the data monitoring application does not require extra hardware and is resilient to external attacks.

The data monitoring application may receive the acoustic communication signal 118 from the transmitter 106 and decode the signal to retrieve the data encoded therein in various forms. The data monitoring application may also demultiplex multiple data streams from multiple data sources 102a-102n. In an exemplary embodiment of the invention, the transmitter 106 may transmit data using the following format:

TP 45|MP 22|EC 1|AF 22|CP 4|CS 50|DS 12|OS 87|AT 90|EP 2|ET 4 where the first two characters (e.g., TP, MP, EC, AF, CP, CS, DS, OS, AT, EP, ET) is a short-form identifier of the data source 102a-102n (e.g., TP=temperature sensor), the numerical value after the sensor identifier is indicative of the output of the sensor, and the character after the numeric value (e.g., "|") provides a delimiter between sensor values.

The data monitoring application may parse the decoded string to obtain the individual data streams from each data source 102a-102n and analyze the received data. In response to this analysis detecting an issue, the data monitoring application may provide a notification to the user that describes the issue. The data monitoring application may also provide the user with data indicating a condition or status of the vehicle (e.g., current speed, engine temperature, maintenance needed, etc.) and provide the user the option of enabling and disabling the reception of data and/or notifications.

When the user installs the data monitoring application, the application may prompt the user for permission to access the microphone of the mobile device and/or external storage locations. If the user does not provide the required permissions, the application may not work properly.

The data monitoring application may include a user interface having multiple screens. These screens may include a home page that includes one or more input controls, e.g., buttons. These input controls may include a settings button, a notifications button, and an analytics button. In response to the user activating one of these buttons, the data monitoring application may display a corresponding page, e.g., a settings page, notifications page, and/or analytics page.

The settings page may be configured to allow the user to enable/disable the microphone and notifications, e.g., using a toggle switch. The data monitoring application may continue receiving the data via the microphone, even if the application is closed, unless the user disables reception of the data. This feature may allow the user to use other applications on the mobile device while the data monitoring application is collecting data in the background.

The notification page may display notifications to the user. For example, if the output of a sensor value has crossed a particular threshold, the data monitoring application may cause the mobile device to emit an audible alert tone and display a message on the notification page that provides information about the alert.

The analytics page may provide the user with in depth analytics of the received data. The decoded data may be parsed for individual sensor values, and the parsed sensor values stored in a database located on the mobile device, such as an SQLite database. In an embodiment of the invention, the analytics page may include one or more user selectable tabs that provide various views. For example, there may be separate tabs that display general analytics, advanced analytics, and/or real time analytics, respectively, between which the user may navigate. These exemplary analytics tabs may work in a similar way. For example, a user interface module may query the database for received data, and the values returned by the database rendered graphically on a display of the mobile device by the user interface module.

The quick view analytics tab may provide sensor values in a graphical format that includes plots of the sensor values over time. A user interface element (e.g., a tag at the end of each plot) may provide information to the user as to whether the sensor data was normal, abnormal, or critical over a previous period, e.g., the previous day.

The advanced analytics tab may allow the user to select the data stream for which they want a plot, e.g., the particular data source 102a-102n. This tab may also allow the user to plot the values of two different data streams at the same time, thereby facilitating comparisons. The advanced analytics tab may also enable users to perform statistical analysis (e.g., determine a mean value) and/or correlations between the displayed values.

The real time analytics tab may allow the user to select the data source 102a-102n (e.g., a sensor) from a dropdown menu. In response to the user selecting the data source 102a-102n, the data monitoring application may display a real time plot of the output of the selected data source 102a-102n.

A mobile application using the Android® mobile operating system, which may be obtained from Google of Mountain View, Calif., has been developed based on the algorithms described above. The mobile application implements the receiver 108 on a smart phone. The data signal broadcast from the transmitter 106 is received by a microphone of the smart phone, and processed by a receiver algorithm. After the data is decoded by the mobile application, the data may be used to provide the user with analytics. These analytics may include the above described interactive graphical representation of the data, real time plots, and/or advanced analytics. The mobile application may also be adapted to handle other types of data besides sensor data, including ads and coupons in a supermarket.

Additional Applications

Additional applications of embodiments of the invention may include the exchange of encryption keys, transmission of metadata, data transport for Internet of Things (IoT) applications, military communications, and short message services.

To increase the security of intra-vehicular communication, data transmitted over Controller Area Network (CAN) data buses may be encrypted so that a key must be shared between devices transmitting data over this wired medium. However, exchanging encryption keys over the CAN data bus may subject vehicular systems to external attacks. Advantageously, embodiments of the invention may allow encrypted keys to be exchanged between components using acoustic signals rather than electronic signals. This may improve the security of encrypted messages exchanged on a CAN bus due to the improved security provided the acoustic signals as compared to electronic signals, and by separating the encryption keys from the encrypted data.

Acoustic communication signals may also be used to share metadata while playing music files. People often listen to music, especially when travelling in a vehicle. Every time a user wants to identify the artist, the album, or obtain any other information about a song, they will typically need to use a search engine (e.g., Google®) or some other web application (e.g., Spotify®) to find this information. Embodiments of the invention may be used to embed this metadata into the audio of the song itself. This data could then be extracted from the audio while the song is being played and displayed to the user, thereby allowing the user to avoid time consuming data searches.

The emergence of the Internet of Things (IoT) may provide an incentive to move communications away from conventional protocols that rely on electromagnetic signals. IoT technologies enable every-day objects such as appliances to collect and exchange data. With ever increasing numbers of IoT devices, the radio spectrum is becoming more congested. This may drive demand for systems that communicate without further contributing to this congestion, and/or that are able to operate reliably in an environment having a high level of electromagnetic interference. In addition, IoT systems that use acoustic signals for communication may also be more resistant to attacks than systems using radio waves.

IoT devices that communicate with each other over short distances and that only require low data rates may be well suited to use acoustic communication signals rather than electromagnetic signals. A conventional IoT node may include one or more sensors, a processing unit, and a transceiver that transmits data received from the sensor. Embodiments of invention may be used to replace the processing unit and transceiver of a conventional IoT device. This may provide an advantage for smart home applications that do not require high data rates by improving the application's resistance to jamming attacks, for example.

Military troops often operate in remote locations where access to radio frequency communications is impaired by adversaries, who may use jammers or other methods to interfere with conventional communication signals. Embodiments of the invention may be used in these situations to allow troops to communicate over short distances using acoustic communication signals that are impervious to radio frequency jamming.

Embodiments of the invention may also be used to support Short Message Service (SMS) applications in places with limited access to wireless networks. For example, an SMS application could switch seamlessly between acoustic communication and wireless or Internet based applications for communicating with other devices.

EXPERIMENTAL RESULTS

Figure 11:
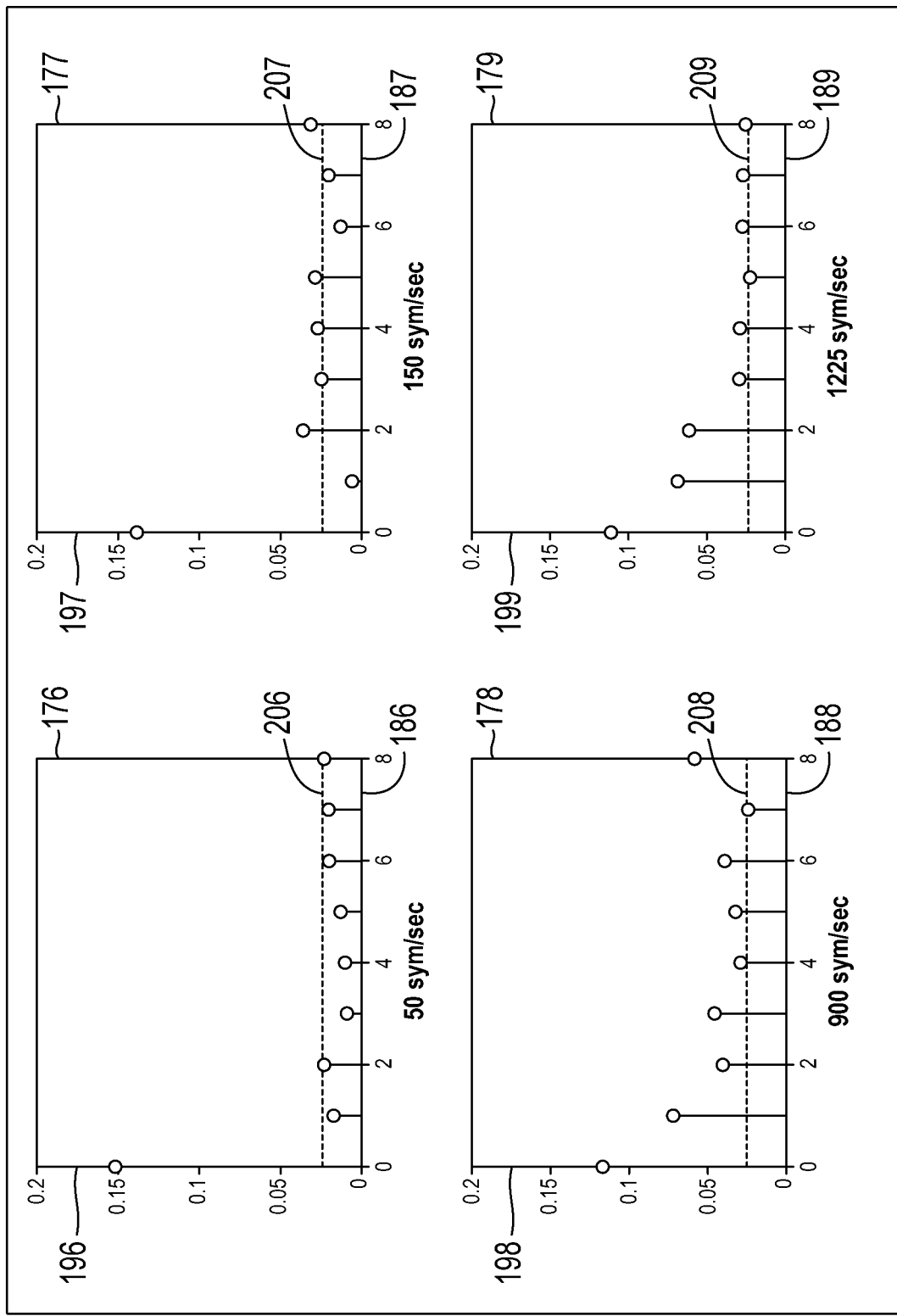
FIG. 11 is a graphical view showing exemplary bit error rates that may be achieved using various symbol transmission rates in the operating environment of FIG. 6.

Referring now to FIG. 11, intra-vehicular channel sounding experiments have been performed using Orthogonal Frequency-Division Multiplexing (ODFM) at a variety of symbol rates, e.g., 50, 150, 900, and 1225 symbols/sec. The amplitude of the signal at each measured channel tap at a selected center frequency for different sampling rates are provided in graphs 176-179. Each graph 176-179 includes a horizontal axis 186-189 that indicates a channel tap, a vertical axis 196-199 that indicates an amplitude of the output of the tap, a dashed line 206-209 that indicates a noise level. As can be seen, for low symbol rates only tap 0 has a significant output, which may imply that the transmission channel is a flat fading channel. However, for transmission bandwidths of 900 and 1225 symbols/sec, frequency selectivity starts to become apparent.

Figure 12:
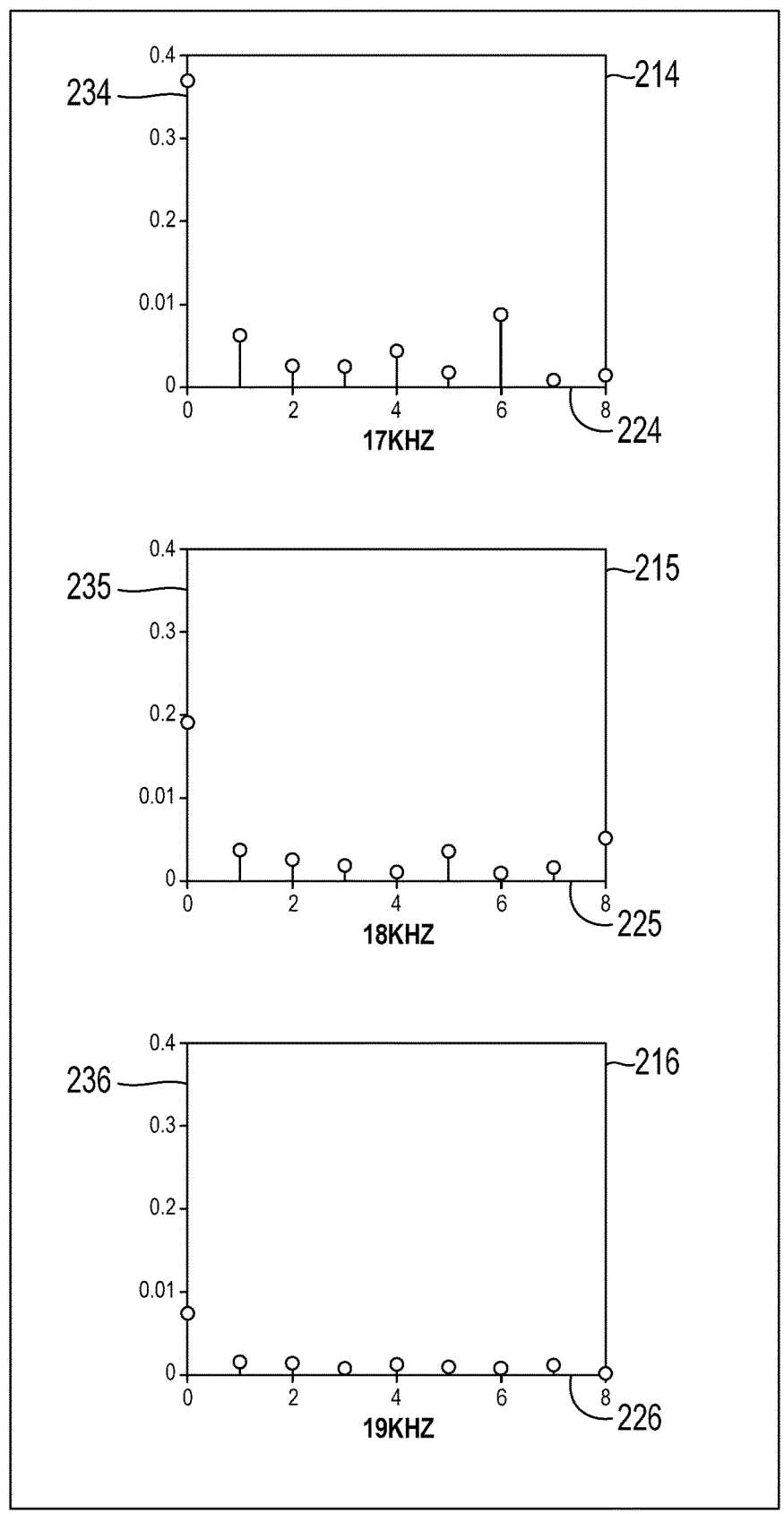
FIG. 12 is a graphical view showing exemplary bit error rates that may be achieved using various center frequencies in the operating environment of FIG. 6.

FIG. 12 depicts graphs 214-216 of the above measurements at 900 symbols/sec. with center frequencies of 17 kHz (graph 214), 18 kHz (graph 215), and 19 kHz (graph 216). Each graph 214-216 includes a horizontal axis 224-226 that indicates a channel tap, and a vertical axis 234-236 that indicates an amplitude of the output of the tap. To address the frequency selectivity indicated by the reduction in the outputs of the taps as the center frequency is increased from 17 kHz to 19 KHz, a 9-subchannel OFDM transmission with 17-symbol cyclic prefix was implemented. In addition to the modules and processing blocks described above, which may be applied on each subchannel, the OFDM transmitter may include a cyclic prefix and an Inverse Fast-Fourier Transform (IFFT) block. At the receiver, an associated Fast-Fourier Transform (FFT) block may be implemented in the processing module of the receiver, and the cyclic prefix removed at the output of the FFT block.

Figure 13:
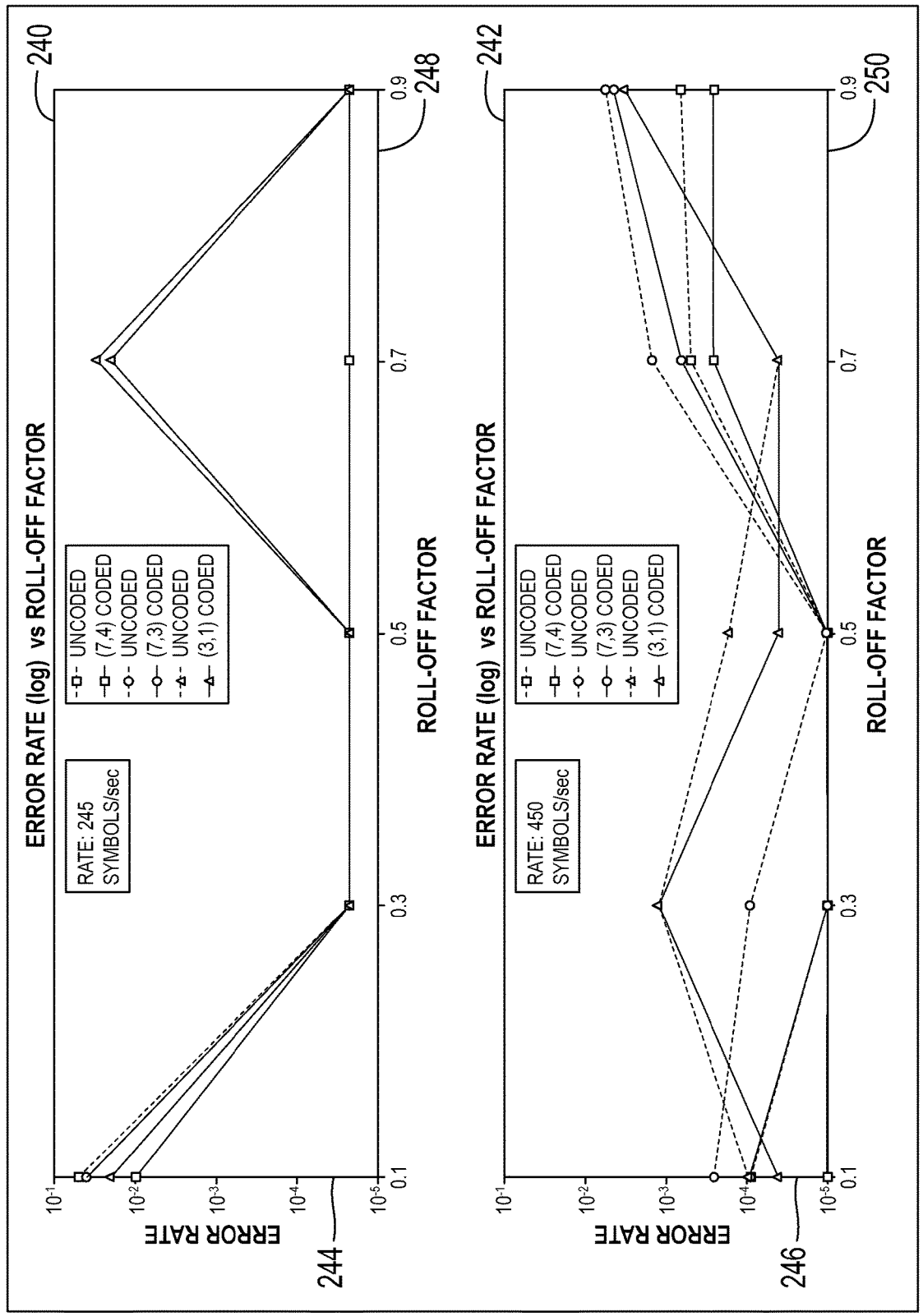
FIG. 13 is a graphical view showing exemplary bit error rates that may be achieved using various matched filter roll-off factors and error coding schemes in the operating environment of FIG. 6.

FIG. 13 depicts graphs showing results associated with in-lab experiments as well as those conducted in an intra-vehicular setting. Graph 240 shows the bit-error-rate (BER) for QPSK modulation at a symbol rate of 245 symbols/sec. for different error-coding schemes. Graph 242 shows the BER for QPSK modulation at 450 symbols/sec. for the same set of error coding schemes as graph 240. QPSK modulation is used throughout, so in each case the corresponding data rates in bps are twice the symbol rate. Each of the graphs 240, 242 includes a vertical axis 244, 246 that indicates the BER on a logarithmic scale, and a horizontal axis 248, 250 that indicates a roll-off factor for the raised cosine filter. At each symbol rate, the lowest BER is produced with a matched filter having a roll-off factor of 0.5. While a low BER was achieved at a data rate of 490 bps, the graphs 200, 202 indicate that outer turbo codes may be advisable at rates approaching 1 kbps.

Figure 14:
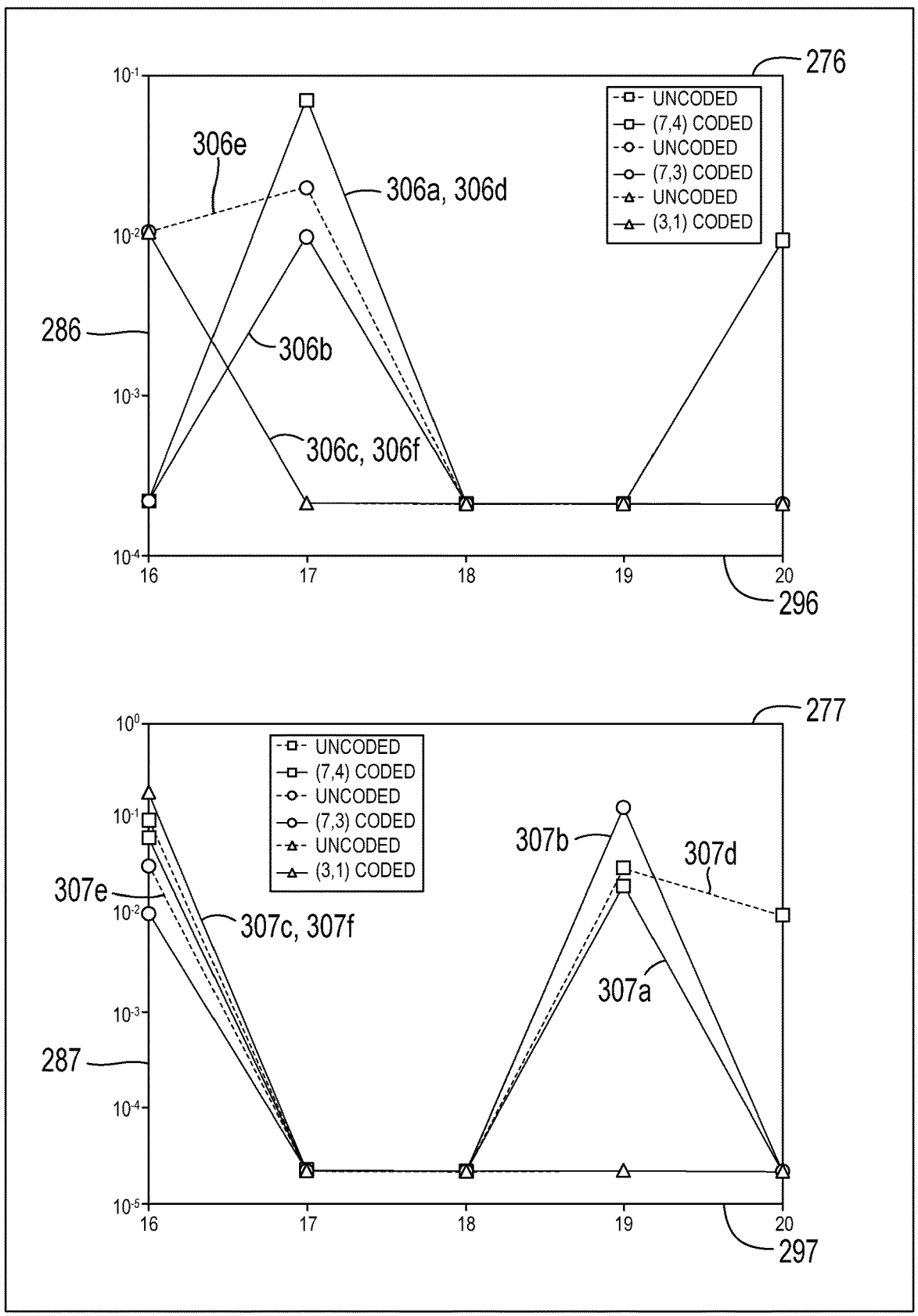
FIGS. 14-16 are graphical views showing exemplary bit error rates that may be achieved using various carrier frequencies, symbol rates, and error coding schemes in the operating environment of FIG. 6.
Figure 15:
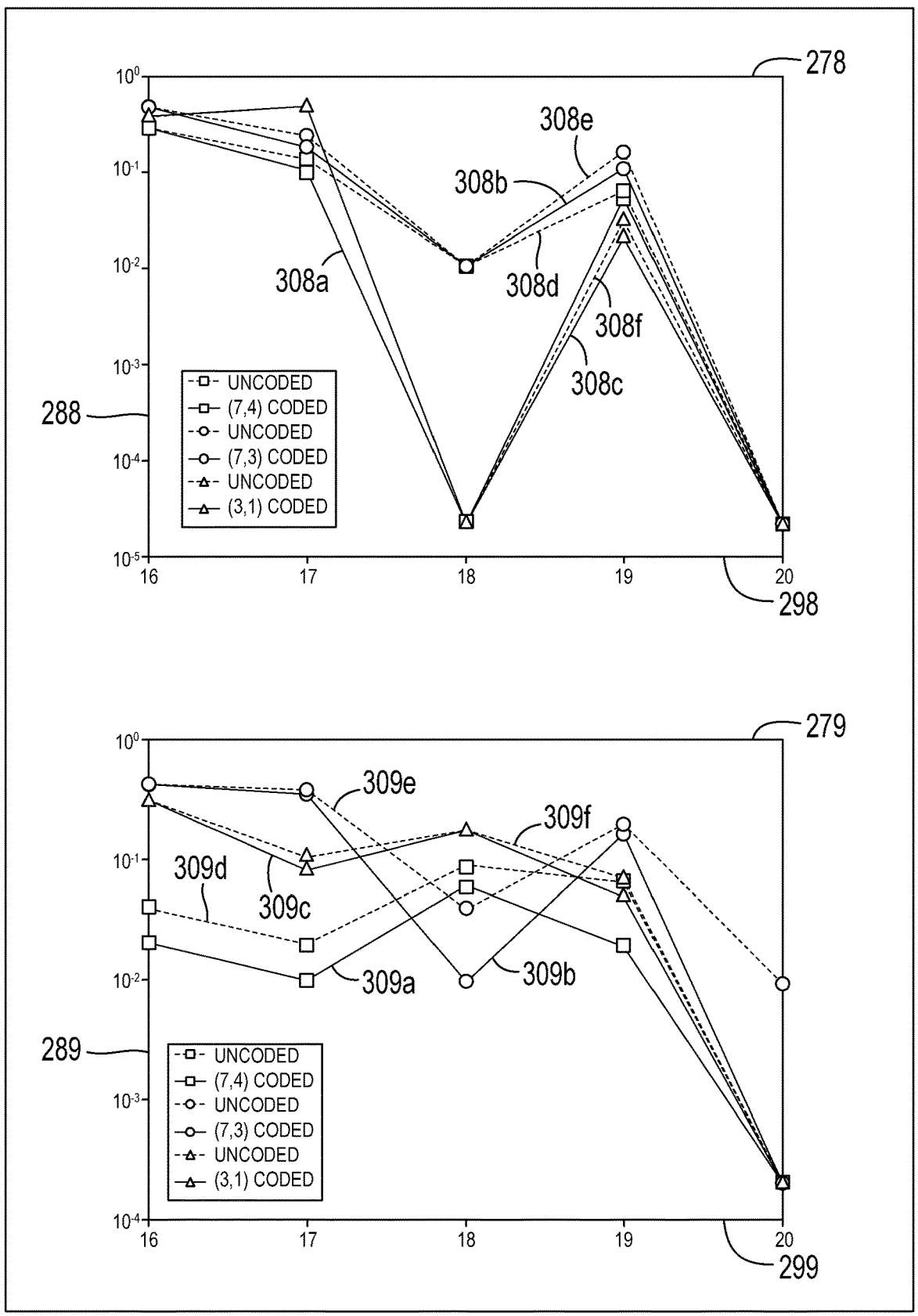
Figure 16:
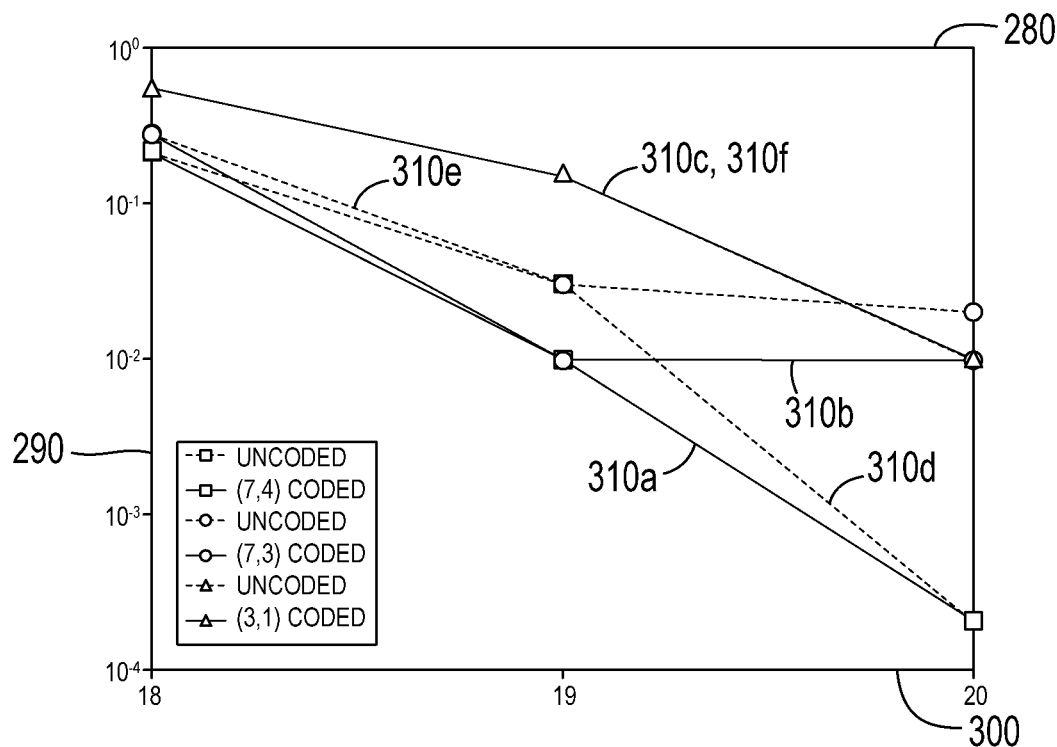

FIGS. 14-16 depict graphs 276-280 that include plots showing exemplary BER verses center frequency at symbol rates of 245, 350, 450, 525, and 630 symbols/sec. for different error-coding schemes. Each of the graphs includes a respective vertical axis 286-290 that indicates the BER on a logarithmic scale, and a respective horizontal axis 296-300 that indicates a center frequency. Plots show error rates for (7,4) coded (plots 306a-310a); (7,3) coded (plots 306b-310b); (3, 1) coded (plots 306c-310c); and corresponding uncoded signals (plots 306d-310d, 306e-310e, and 306f-310f) in each of the respective graphs. As with FIG. 13, QPSK modulation is used throughout, so the corresponding data rates in bps are twice the symbol rate. As can be seen, a center frequency of 20 kHz gives consistently favorable results. The plots further show that for data rate over 1 kbps, the outer coder is needed to achieve a BER below $10^{-3}$.

Figure 17:
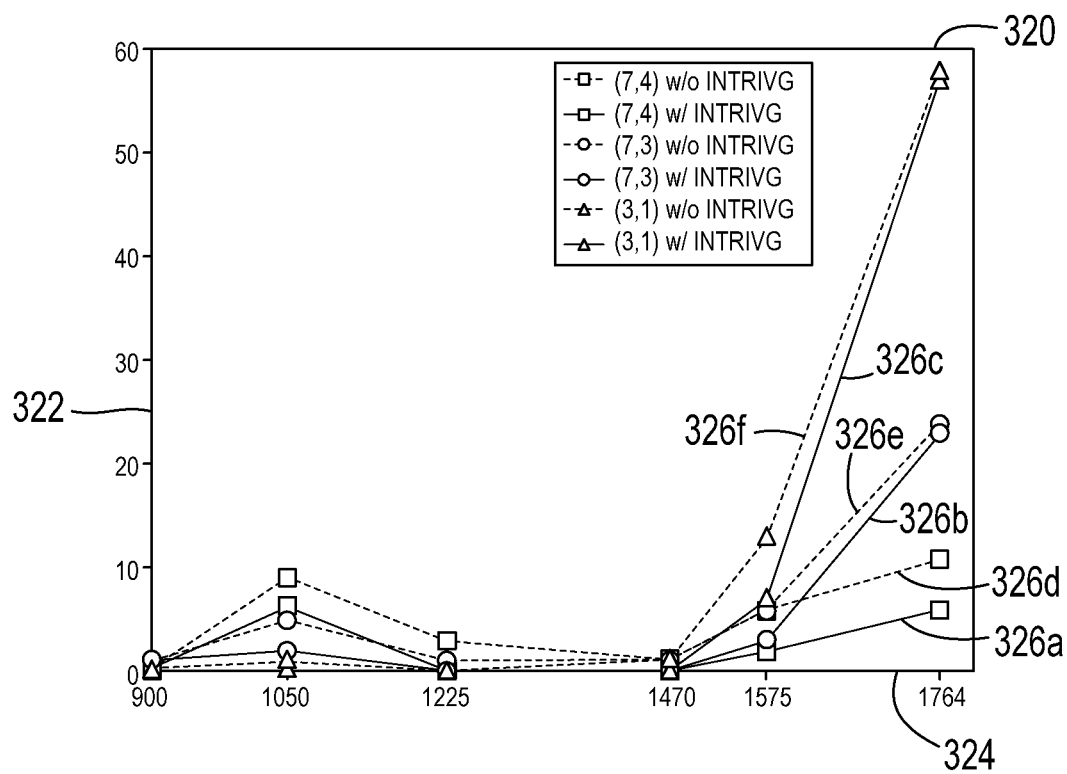
FIG. 17 is a graphical view showing exemplary bit error rates that may be achieved using various symbol rates and error coding schemes in the operating environment of FIG. 6.

FIG. 17 depicts a graph 320 including a vertical axis 322 that indicates percent BER on a linear scale, a horizontal axis 324 that indicates a symbol rate, and a plurality of plots 326a-326f showing BER the as a function of the symbol rate and error coding at a center frequency of 20 kHz in an intravehicular setting using QPSK modulation. Plots show error rates for (7,4) coded (plot 326a); (7,3) coded (plot 326b); (3, 1) coded (plot 326c); and corresponding uncoded signals (plots 326d-326f). As can be seen from the plots 326a-326f, data rates over 2 kbps are achieved for all coding schemes tested. However, for data rates over 3 kbps, the outer code is necessary to prevent high BER. With the integration of outer codes, a BER of $10^{-3}$ has been achieved for a data rate of 2.5 kbps.

Figure 18:
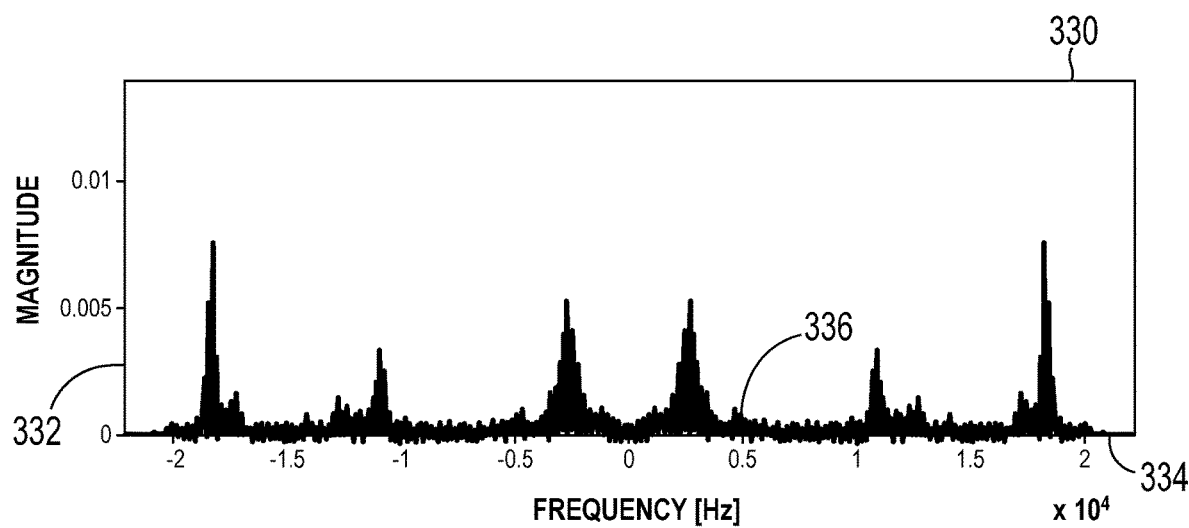
FIG. 18 is a graphical view of an exemplary received acoustic signal that includes a communication signal carrying the exemplary filtered audio sample of FIG. 5.

Indoor channel sounding experiments have also been performed. FIG. 18 depicts a graph 330 of an exemplary spectrum for the acoustic signal 36 generated by the exemplary signals of FIGS. 3-5. Graph 330 includes a vertical axis 332 that indicates the amplitude of the signal, a horizontal axis 334 that indicates frequency, and a plot 336 showing signal strength the as a function of frequency across a band of 0 to 22 kHz. To obtain the signal characterized by plot 336, the speakers 38 were placed in a classroom environment, and the transducer/microphone 12, 42 was provided by a MacBook Air®, which is a laptop computer available from Apple Inc. of Cupertino Calif. The MacBook Air was used to provide both the transmitter 10 and the receiver 40. In addition to the communication signal 32 in the 17.5-20.5 kHz band, audio energy was added in both the low-frequency speech band and the relatively higher frequency band around 10 kHz to provide background noise. As can be seen from plot 336, there is minimal activity in the modulated band, which is believed to be typical for closed environments.

Figure 19:
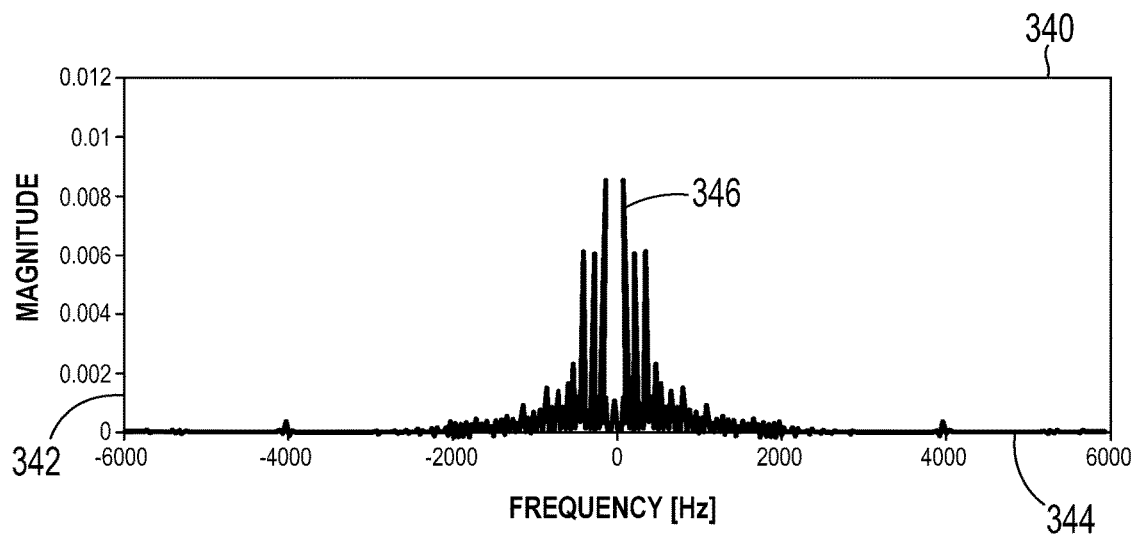
FIG. 19 is a graphical view of an audio signal extracted from the received acoustic signal of FIG. 18.

After A/D conversion, the digitized analog signal was low-pass filtered by a FIR low-pass filter with the same properties as the SSB filter 20 described above, and that covered both sidebands. The resulting spectrum of the filtered output signal is depicted in FIG. 19, which depicts a graph 340 including a vertical axis 342 that indicates the amplitude of the signal, a horizontal axis 344 that indicates frequency, and a plot 346 showing amplitude as a function of frequency across a band of 0 to 6 kHz. In comparison to the original signal, the received signal was intelligible and the speech properties generally indistinguishable from the original signal.

With regard to the digital signal 24, after conversion to baseband, a Schmidl-Cox algorithm was used to lock on the preamble for frame detection and synchronization. Details of the Schmidl-Cox algorithm may be found in "Robust Frequency and Timing Synchronization for OFDM", Timothy M. Schmidl and Donald C. Cox, IEEE Transactions on Communications, Vol. 45, No. 12, December 1997, the entirety of which is incorporated by reference herein.

Frame detection may also be used for audio communication. For example, frame detection may be used to indicate the presence of an audio signal. This, in turn, may be used to activate the audio circuitry. Activating the audio circuitry using frame detection may save power by allowing the energy consumption in the A/D components to be eliminated during inactive periods when no ultrasound signals are being transmitted to the targeted group.

After frame synchronization, the signal may be matched filtered, sampled, and decoded. For example, a synchronization block in the receiver 40 may recover the symbol and frame timing at the sample level. This may be achieved by shifting the output of the matched filter, correlating the output with the pilot sequence over the length of the sequence, and choosing the cross-correlation peak at the sample rate as the correct synchronization time. The synchronization accuracy can be controlled by adjusting the sampling rate. After the pilot sequence is detected, the symbols attached to it may be mapped into bits. These bits may define the original digital information that was initially transmitted. The channel response may be defined by physical attributes of the operating environment, such as the location of the speaker, microphone, and reflectors within the operating environment. Embodiments of the invention may thereby implement coded communication and achieve data rates close to the theoretical capacity of the channel.

The above described system was first implemented in software using MATLAB®, which is a programming language available from The Mathworks, Inc. of Natick Mass. Hardware embodiments were also constructed using a transmitter and a receiver implemented on separate Raspberry Pi® controllers. Raspberry Pi controllers are single-board computers that can be obtained from the Raspberry Pi Foundation of Caldecote, Cambridgeshire, UK.

In the hardware embodiment, the transmitter 10 comprised a Raspberry Pi controller connected to a speaker via an audio jack, and the receiver 40 comprised another Raspberry Pi controller connected to the microphone 42 via an audio card. The transmitter 10 acted as a multiplexer which combined data from various sources into a single stream of data. Once the data was represented as a single stream, the data was processed as described above and broadcast by the speaker 38. At the receiver 40, the microphone 42 picked up the acoustic data signal broadcast by the transmitter 10. The data signal was then processed by the receiver 40 as described above, and the data decoded into different sensor values.

Figure 20:
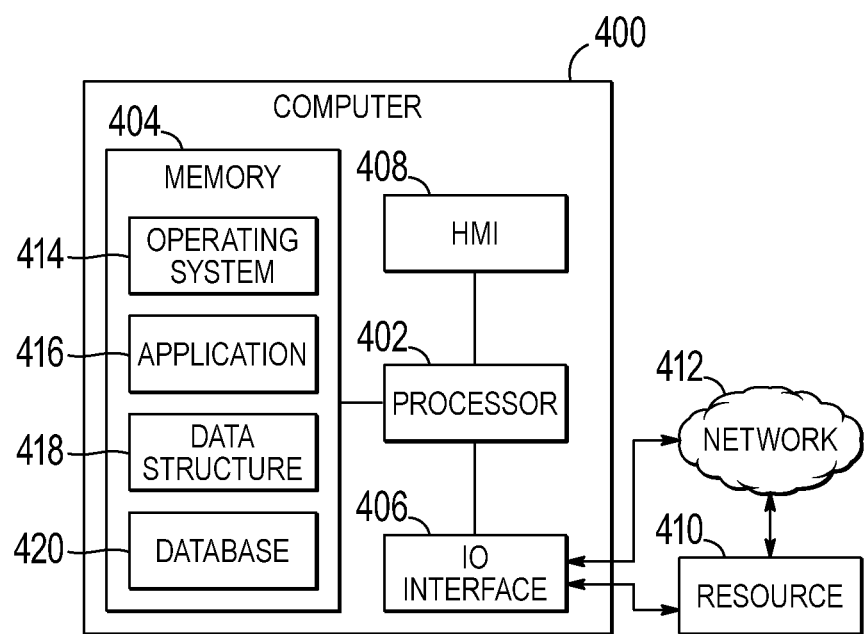
FIG. 20 is a diagrammatic view of a computer that may be used to implement one or more of the components and/or processes shown in FIGS. 1, 2, and 6-10.

Referring now to FIG. 20, embodiments of the invention described above, or portions thereof, may be implemented using one or more computer devices or systems, such as exemplary computer 400. The computer 400 may include a processor 402, a memory 404, an input/output (I/O) interface 406, and a Human Machine Interface (HMI) 408. The computer 400 may also be operatively coupled to one or more external resources 410 via the network 412 and/or I/O interface 406. External resources may include, but are not limited to, servers, databases, mass storage devices, peripheral devices, cloud-based network services, or any other resource that may be used by the computer 400.

The processor 402 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 404. Memory 404 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or data storage devices such as a hard drive, optical drive, tape drive, volatile or non-volatile solid state device, or any other device capable of storing data.

The processor 402 may operate under the control of an operating system 414 that resides in memory 404. The operating system 414 may manage computer resources so that computer program code embodied as one or more computer software applications, such as an application 416 residing in memory 404, may have instructions executed by the processor 402. In an alternative embodiment, the processor 402 may execute the application 416 directly, in which case the operating system 414 may be omitted. One or more data structures 418 may also reside in memory 404, and may be used by the processor 402, operating system 414, or application 416 to store or manipulate data.

The I/O interface 406 may provide a machine interface that operatively couples the processor 402 to other devices and systems, such as the external resource 410 or the network 412. The application 416 may thereby work cooperatively with the external resource 410 or network 412 by communicating via the I/O interface 406 to provide the various features, functions, applications, processes, or modules comprising embodiments of the invention. The application 416 may also have program code that is executed by one or more external resources 410, or otherwise rely on functions or signals provided by other system or network components external to the computer 400. Indeed, given the nearly endless hardware and software configurations possible, persons having ordinary skill in the art will understand that embodiments of the invention may include applications that are located externally to the computer 400, distributed among multiple computers or other external resources 410, or provided by computing resources (hardware and software) that are provided as a service over the network 412, such as a cloud computing service.

The HMI 408 may be operatively coupled to the processor 402 of computer 400 in a known manner to allow a user to interact directly with the computer 400. The HMI 408 may include video or alphanumeric displays, a touch screen, a speaker, and any other suitable audio and visual indicators capable of providing data to the user. The HMI 408 may also include input devices and controls such as an alphanumeric keyboard, a pointing device, keypads, pushbuttons, control knobs, microphones, etc., capable of accepting commands or input from the user and transmitting the entered input to the processor 402.

A database 420 may reside in memory 404, and may be used to collect and organize data used by the various systems and modules described herein. The database 420 may include data and supporting data structures that store and organize the data. In particular, the database 420 may be arranged with any database organization or structure including, but not limited to, a relational database, a hierarchical database, a network database, or combinations thereof. A database management system in the form of a computer software application executing as instructions on the processor 402 may be used to access the information or data stored in records of the database 420 in response to a query, where a query may be dynamically determined and executed by the operating system 414, other applications 416, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams.

The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An apparatus comprising a transmitter configured to:
   receive a first signal to be transmitted to a device within an area covered by an audio system configured to emit acoustic signals into the area;
   map the first signal to a set of symbols to generate a sequence of symbols corresponding to the first signal;
   add a pilot sequence to the sequence of symbols;
   modulate a carrier frequency using the sequence of symbols to generate a second signal in an acoustic band that carries the first signal; and
   transmit the second signal to the audio system.

2. The apparatus of claim 1 wherein the transmitter is further configured to:
   apply a filter to the first signal to limit an effective bandwidth of the second signal.

3. The apparatus of claim 1 further comprising the device, wherein the device is configured to:
   receive an acoustic signal from the audio system that includes the second signal;
   extract the sequence of symbols from the second signal; and use the pilot sequence for one or more of synchronization, determining a frequency mismatch, determining a phase mismatch, or to characterize a channel.

4. The apparatus of claim 1 wherein the acoustic band consists of frequencies beyond an audible range of human hearing, but within a range of frequencies that can be transmitted by the audio system.

5. The apparatus of claim 1 further comprising the device, wherein the device is configured to:
   receive an acoustic signal from the audio system that includes the second signal;
   extract the first signal from the second signal; and
   provide the first signal to a user of the device.

6. The apparatus of claim 5 wherein extracting the first signal from the second signal includes detecting a frame of the first signal, and the device is further configured to activate audio circuitry in response to detecting the frame.

7. The apparatus of claim 1 wherein the area is a space proximate to a vehicle, and the first signal is received from a data source associated with the vehicle.

8. The apparatus of claim 7 wherein the device is configured to display information related to a condition of the vehicle based on the first signal.

9. The apparatus of claim 1 further comprising the device, wherein the device is coupled to a controller and configured to provide the first signal to the controller.

10. The apparatus of claim 1 wherein the first signal includes metadata related to an audio signal being transmitted by the audio system, and the device is configured to display the metadata.

11. The apparatus of claim 1 wherein the first signal includes a plurality of frames, the pilot sequence includes a plurality of pilot symbols, and the transmitter is configured to:
    add the pilot sequence to the sequence of symbols by inserting a pilot symbol into each frame of the first signal to form data packets.

12. The apparatus of claim 11 wherein the pilot symbol is inserted as a header of the frame.

13. The apparatus of claim 11 wherein the transmitter is configured to map the first signal to the set of symbols to generate the sequence of symbols corresponding to the first signal by mapping each data packet to one or more symbols of the sequence of symbols.

14. A method comprising:
    receiving a first signal to be transmitted to a device within an area covered by an audio system configured to emit acoustic signals into the area;
    mapping the first signal to a set of symbols to generate a sequence of symbols corresponding to the first signal;
    adding a pilot sequence to the sequence of symbols;
    modulating a carrier frequency using the sequence of symbols to generate a second signal in an acoustic band that carries the first signal; and
    transmitting the second signal to the audio system.

15. The method of claim 14 wherein the acoustic band consists of frequencies beyond an audible range of human hearing, but within a range of frequencies that can be transmitted by the audio system.

16. The method of claim 14 further comprising:
    receiving an acoustic signal from the audio system that includes the second signal at a user device;
    extracting the first signal from the second signal; and
    providing the first signal to a user of the user device.

17. The method of claim 16 wherein extracting the first signal from the second signal includes detecting a frame of the first signal, and the user device is further configured to activate audio circuitry in response to detecting the frame.

18. The method of claim 14 wherein the area is a space proximate to a vehicle and the first signal is received from a data source associated with the vehicle, and further comprising displaying information related to a condition of the vehicle based on the first signal.

19. The method of claim 14 further comprising:
    receiving an acoustic signal from the audio system that includes the second signal at a receiver;
    extracting the first signal from the second signal; and
    transmitting the first signal to a controller.

20. The method of claim 14 wherein the first signal includes metadata related to an audio signal being transmitted by the audio system, and further comprising displaying the metadata on the device.

21. A computer program product comprising:
    a non-transitory computer-readable storage medium; and
    program code stored on the non-transitory computer-readable storage medium that, when executed by one or more processors, causes the one or more processors to:
    receive a first signal to be transmitted to a device within an area covered by an audio system configured to emit acoustic signals into the area;
    map the first signal to a set of symbols to generate a sequence of symbols corresponding to the first signal;
    add a pilot sequence to the sequence of symbols;
    modulate a carrier frequency using the sequence of symbols to generate a second signal in an acoustic band that carries the first signal; and
    transmit the second signal to the audio system.

* * * * *